US007911992B2

(12) United States Patent
Binder

(10) Patent No.: US 7,911,992 B2
(45) Date of Patent: Mar. 22, 2011

(54) ADDRESSABLE OUTLET, AND A NETWORK USING THE SAME

(75) Inventor: Yehuda Binder, Hod Hasharon (IL)

(73) Assignee: Mosaid Technologies Incorporated, Ottawa, Ontario (CA)

( * ) Notice: Subject to any disclaimer, the term of this patent is extended or adjusted under 35 U.S.C. 154(b) by 170 days.

(21) Appl. No.: 12/021,912

(22) Filed: Jan. 29, 2008

(65) Prior Publication Data

US 2008/0205606 A1 Aug. 28, 2008

Related U.S. Application Data

(63) Continuation of application No. 10/491,989, filed as application No. PCT/IL03/00948 on Nov. 12, 2003, now Pat. No. 7,522,615.

(51) Int. Cl.
*G06F 15/00* (2006.01)
(52) U.S. Cl. .......................................... 370/318; 375/233
(58) Field of Classification Search .................. 370/219, 370/338, 412, 429; 455/552.1
See application file for complete search history.

(56) References Cited

U.S. PATENT DOCUMENTS

| | | | |
|---|---|---|---|
| 3,699,523 A | 10/1972 | Percher | |
| 3,717,858 A | 2/1973 | Hadden | |
| 3,730,980 A | 5/1973 | Kirk, Jr. | |
| 3,739,226 A | 6/1973 | Seiter | |
| 3,805,265 A | 4/1974 | Lester | |
| 3,836,888 A | 9/1974 | Boenke et al. | |
| 3,846,703 A | 11/1974 | Stewart et al. | |
| 3,872,319 A | 3/1975 | Platzer | |
| 3,886,454 A | 5/1975 | Oakley et al. | |
| 3,959,772 A | 5/1976 | Wakasa et al. | |
| 4,031,543 A | 6/1977 | Holz | |
| 4,063,220 A | 12/1977 | Metcalfe et al. | |
| 4,079,415 A | 3/1978 | Will | |
| 4,272,759 A | 6/1981 | Handy | |
| 4,303,993 A | 12/1981 | Panepinto, Jr. et al. | |
| 4,343,042 A | 8/1982 | Schrock et al. | |
| 4,367,548 A | 1/1983 | Cotten, Jr. et al. | |
| 4,389,694 A | 6/1983 | Cornwell, Jr. | |
| 4,413,229 A | 11/1983 | Grant | |
| 4,463,341 A | 7/1984 | Iwasaki | |

(Continued)

FOREIGN PATENT DOCUMENTS

EP        0 200 016 A2      11/1986

(Continued)

OTHER PUBLICATIONS

Universal Serial Bus Specification—Rev. 1.0, Jan. 15, 1996; Sec. 4.2.1 pp. 29-30. cited by other.

(Continued)

*Primary Examiner* — Sam Bhattacharya
(74) *Attorney, Agent, or Firm* — Browdy and Neimark, PLLC

(57) ABSTRACT

An addressable outlet for use as part of local area network based on wiring installed in a building, such as telephone, electrical, cable television, dedicated wiring, and the like. The use of such wiring for data communications networks in addition to the wiring's primary usage creates a need for ways of determining the condition of the network and monitoring this information remotely. Network condition includes such factors as continuity of wiring, connector status, connected devices, topology, signal delays, latencies, and routing patterns. Providing basic processing and addressing capabilities within the outlet permits messaging to and from specific individual outlets, thereby allowing inquiries and reports of the condition of the immediate environment of each outlet. In addition, outlets can be configured with sensors to report on voltage, temperature, and other measurable quantities.

43 Claims, 9 Drawing Sheets

U.S. PATENT DOCUMENTS

| | | | |
|---|---|---|---|
| 4,467,314 A | 8/1984 | Weikel et al. |
| 4,477,896 A | 10/1984 | Aker |
| 4,484,185 A | 11/1984 | Graves |
| 4,484,218 A | 11/1984 | Boland et al. |
| 4,509,211 A | 4/1985 | Robbins |
| 4,512,025 A | 4/1985 | Frankel et al. |
| 4,512,033 A | 4/1985 | Schrock |
| 4,521,881 A | 6/1985 | Stapleford et al. |
| 4,535,401 A | 8/1985 | Penn |
| 4,538,174 A | 8/1985 | Gargini et al. |
| 4,551,721 A | 11/1985 | Kozlik |
| 4,623,920 A | 11/1986 | Dufresne et al. |
| 4,633,217 A | 12/1986 | Akano |
| 4,636,914 A | 1/1987 | Belli |
| 4,639,714 A | 1/1987 | Crowe |
| 4,644,526 A | 2/1987 | Wu |
| 4,646,296 A | 2/1987 | Bartholet et al. |
| 4,647,725 A | 3/1987 | Dellinger et al. |
| 4,651,022 A | 3/1987 | Cowley |
| 4,733,389 A | 3/1988 | Puvogel |
| 4,734,919 A | 3/1988 | Tae |
| 4,736,367 A | 4/1988 | Wroblewski et al. |
| 4,750,094 A | 6/1988 | Krasik |
| 4,755,792 A | 7/1988 | Pezzolo et al. |
| 4,761,646 A | 8/1988 | Choquet et al. |
| 4,785,448 A | 11/1988 | Reichert et al. |
| 4,787,082 A | 11/1988 | Delaney et al. |
| 4,799,211 A | 1/1989 | Felker et al. |
| 4,803,485 A | 2/1989 | Rypinski |
| 4,806,905 A | 2/1989 | McGowan, III et al. |
| 4,814,941 A | 3/1989 | Speet et al. |
| 4,815,106 A | 3/1989 | Propp et al. |
| 4,866,733 A | 9/1989 | Morishita |
| 4,885,803 A | 12/1989 | Hermann et al. |
| 4,890,102 A | 12/1989 | Oliver |
| 4,891,694 A | 1/1990 | Way |
| 4,893,326 A | 1/1990 | Duran et al. |
| 4,896,349 A | 1/1990 | Kubo et al. |
| 4,901,218 A | 2/1990 | Cornwell |
| 4,912,721 A | 3/1990 | Pidgeon, Jr. et al. |
| 4,918,690 A | 4/1990 | Markkula, Jr. et al. |
| 4,924,349 A | 5/1990 | Buehler et al. |
| 4,926,158 A | 5/1990 | Zeigler |
| 4,937,811 A | 6/1990 | Harris |
| 4,937,819 A | 6/1990 | King |
| 4,953,055 A | 8/1990 | Douhet et al. |
| 4,989,081 A | 1/1991 | Miyagawa et al. |
| 4,992,774 A | 2/1991 | McCullough |
| 4,994,908 A | 2/1991 | Kuban et al. |
| 5,010,399 A | 4/1991 | Goodman |
| 5,021,779 A | 6/1991 | Bisak |
| 5,027,426 A | 6/1991 | Chiocca, Jr. |
| 5,032,819 A | 7/1991 | Sakuragi et al. |
| 5,033,062 A | 7/1991 | Morrow et al. |
| 5,033,112 A | 7/1991 | Bowling et al. |
| 5,034,531 A | 7/1991 | Friary et al. |
| 5,065,133 A | 11/1991 | Howard |
| 5,068,890 A | 11/1991 | Nilssen |
| 5,089,927 A | 2/1992 | Bulan et al. |
| 5,089,974 A | 2/1992 | Demeyer et al. |
| 5,114,365 A | 5/1992 | Thompson |
| 5,121,482 A | 6/1992 | Patton |
| 5,144,544 A | 9/1992 | Jenneve et al. |
| 5,148,144 A | 9/1992 | Sutterlin et al. |
| 5,150,365 A | 9/1992 | Hirata et al. |
| 5,192,231 A | 3/1993 | Dolin |
| 5,239,540 A | 8/1993 | Rovira et al. |
| 5,243,627 A | 9/1993 | Betts et al. |
| 5,255,267 A | 10/1993 | Hansen et al. |
| 5,274,631 A | 12/1993 | Bhardwaj |
| 5,278,889 A | 1/1994 | Papanicolaou et al. |
| 5,285,477 A | 2/1994 | Leonowich |
| 5,311,518 A | 5/1994 | Takato et al. |
| 5,321,736 A | 6/1994 | Beasley |
| 5,321,846 A | 6/1994 | Yokota et al. |
| 5,334,975 A | 8/1994 | Wachob et al. |
| 5,343,240 A | 8/1994 | Yu |
| 5,347,549 A | 9/1994 | Baumann et al. |
| 5,368,041 A | 11/1994 | Shambroom |
| 5,381,804 A | 1/1995 | Shambroom |
| 5,391,932 A | 2/1995 | Small et al. |
| 5,402,902 A | 4/1995 | Bouley |
| 5,406,260 A | 4/1995 | Cummings et al. |
| 5,408,260 A | 4/1995 | Arnon |
| 5,414,708 A | 5/1995 | Webber et al. |
| 5,418,559 A | 5/1995 | Blahut |
| 5,421,030 A | 5/1995 | Baran |
| 5,422,519 A | 6/1995 | Russell |
| 5,432,838 A | 7/1995 | Purchase et al. |
| 5,438,678 A | 8/1995 | Smith |
| 5,440,335 A | 8/1995 | Beveridge |
| 5,450,393 A | 9/1995 | Watanabe et al. |
| 5,451,923 A | 9/1995 | Seberger et al. |
| 5,457,629 A | 10/1995 | Miller et al. |
| 5,469,150 A | 11/1995 | Sitte |
| 5,473,517 A | 12/1995 | Blackmon |
| 5,477,091 A | 12/1995 | Fiorina et al. |
| 5,483,656 A | 1/1996 | Oprescu et al. |
| 5,489,894 A | 2/1996 | Murray |
| 5,491,402 A | 2/1996 | Small |
| 5,500,794 A | 3/1996 | Fujita |
| 5,517,172 A | 5/1996 | Chiu |
| 5,521,631 A | 5/1996 | Budow et al. |
| 5,525,962 A | 6/1996 | Tice |
| 5,528,089 A | 6/1996 | Guiset et al. |
| 5,530,748 A | 6/1996 | Ohmori |
| 5,535,336 A | 7/1996 | Smith et al. |
| 5,539,449 A | 7/1996 | Blahut et al. |
| 5,539,821 A | 7/1996 | Blonder |
| 5,539,880 A | 7/1996 | Lakhani |
| 5,546,385 A | 8/1996 | Caspi et al. |
| 5,563,515 A | 10/1996 | Kako |
| 5,563,782 A | 10/1996 | Chen et al. |
| 5,569,209 A | 10/1996 | Reitman |
| 5,570,355 A | 10/1996 | Dail et al. |
| 5,572,182 A | 11/1996 | De Pinho Filho et al. |
| 5,574,256 A | 11/1996 | Cottone |
| 5,574,964 A | 11/1996 | Hamlin |
| 5,579,486 A | 11/1996 | Oprescu et al. |
| 5,581,555 A | 12/1996 | Dubberly et al. |
| 5,585,837 A | 12/1996 | Nixon |
| 5,586,121 A | 12/1996 | Moura et al. |
| 5,592,540 A | 1/1997 | Beveridge |
| 5,610,552 A | 3/1997 | Schlesinger et al. |
| 5,619,251 A | 4/1997 | Kuroiwa et al. |
| 5,634,191 A | 5/1997 | Beasley |
| 5,635,896 A | 6/1997 | Tinsley et al. |
| 5,642,155 A | 6/1997 | Cheng |
| 5,644,286 A | 7/1997 | Brosh et al. |
| 5,652,893 A | 7/1997 | Ben-Meir et al. |
| 5,666,293 A | 9/1997 | Metz et al. |
| 5,671,220 A | 9/1997 | Tonomura |
| 5,680,397 A | 10/1997 | Christensen et al. |
| 5,684,826 A | 11/1997 | Ratner |
| 5,689,230 A | 11/1997 | Merwin et al. |
| 5,708,705 A | 1/1998 | Yamashita |
| 5,712,614 A | 1/1998 | Patel et al. |
| 5,719,858 A | 2/1998 | Moore |
| 5,719,872 A | 2/1998 | Dubberly et al. |
| 5,722,076 A | 2/1998 | Sakabe et al. |
| 5,729,824 A | 3/1998 | O'Neill et al. |
| RE35,774 E | 4/1998 | Moura et al. |
| 5,736,965 A | 4/1998 | Mosebrook et al. |
| 5,745,837 A | 4/1998 | Fuhrmann |
| 5,748,634 A | 5/1998 | Sokol et al. |
| 5,754,539 A | 5/1998 | Metz et al. |
| 5,760,822 A | 6/1998 | Coutinho |
| 5,767,895 A | 6/1998 | Yashiro et al. |
| 5,768,552 A | 6/1998 | Jacoby |
| 5,774,526 A | 6/1998 | Propp et al. |
| 5,777,769 A | 7/1998 | Coutinho |
| 5,793,265 A | 8/1998 | Spielman |
| 5,796,739 A | 8/1998 | Kim et al. |
| 5,796,965 A | 8/1998 | Choi et al. |
| 5,799,196 A | 8/1998 | Flannery |
| 5,801,635 A | 9/1998 | Price |
| 5,802,173 A | 9/1998 | Hamilton-Piercy et al. |

| | | | | | | |
|---|---|---|---|---|---|---|
| 5,805,591 | A | 9/1998 | Naboulsi et al. | 6,141,763 A | 10/2000 | Smith et al. |
| 5,805,597 | A | 9/1998 | Edem | 6,144,399 A | 11/2000 | Manchester et al. |
| 5,805,806 | A | 9/1998 | McArthur | 6,157,645 A | 12/2000 | Shobatake |
| 5,812,184 | A | 9/1998 | Martinez | 6,166,496 A | 12/2000 | Lys et al. |
| 5,812,750 | A | 9/1998 | Dev et al. | 6,166,730 A | 12/2000 | Goode et al. |
| 5,815,681 | A | 9/1998 | Kikinis | 6,167,120 A | 12/2000 | Kikinis |
| 5,818,845 | A | 10/1998 | Moura et al. | 6,175,556 B1 | 1/2001 | Allen, Jr. et al. |
| 5,822,677 | A | 10/1998 | Peyrovian | 6,188,314 B1 | 2/2001 | Wallace et al. |
| 5,822,678 | A | 10/1998 | Evanyk | 6,188,557 B1 | 2/2001 | Chaudhry |
| 5,828,293 | A | 10/1998 | Rickard | 6,188,871 B1 | 2/2001 | Kitamura et al. |
| 5,828,558 | A | 10/1998 | Korcharz et al. | 6,192,399 B1 | 2/2001 | Goodman |
| 5,833,350 | A | 11/1998 | Moreland | 6,207,895 B1 | 3/2001 | Engel |
| 5,841,360 | A | 11/1998 | Binder | 6,216,160 B1 | 4/2001 | Dichter |
| 5,845,190 | A | 12/1998 | Bushue et al. | 6,216,171 B1 | 4/2001 | Isono et al. |
| 5,847,751 | A | 12/1998 | Safadi | 6,218,930 B1 | 4/2001 | Katzenberg et al. |
| 5,848,054 | A | 12/1998 | Mosebrook et al. | 6,219,409 B1 | 4/2001 | Smith et al. |
| 5,852,631 | A | 12/1998 | Scott | 6,222,124 B1 | 4/2001 | Pritchard |
| 5,859,584 | A | 1/1999 | Counsell et al. | 6,222,853 B1 | 4/2001 | Mesttinen |
| 5,859,596 | A | 1/1999 | McRae | 6,236,653 B1 | 5/2001 | Dalton et al. |
| 5,870,513 | A | 2/1999 | Williams | 6,243,394 B1 | 6/2001 | Deng |
| 5,884,086 | A | 3/1999 | Amoni et al. | 6,243,413 B1 | 6/2001 | Beukema |
| 5,886,732 | A | 3/1999 | Humpleman | 6,243,571 B1 | 6/2001 | Bullock et al. |
| 5,889,765 | A | 3/1999 | Gibbs | 6,243,818 B1 | 6/2001 | Schwan et al. |
| 5,895,985 | A | 4/1999 | Fischer | 6,246,748 B1 | 6/2001 | Yano |
| 5,896,443 | A | 4/1999 | Dichter et al. | 6,252,754 B1 | 6/2001 | Chaudhry |
| 5,896,556 | A | 4/1999 | Moreland et al. | 6,282,075 B1 | 8/2001 | Chaudhry |
| 5,917,624 | A | 6/1999 | Wagner | 6,297,450 B1 | 10/2001 | Yu |
| 5,923,361 | A | 7/1999 | Sutton, Jr. | 6,301,527 B1 | 10/2001 | Butland et al. |
| 5,936,660 | A | 8/1999 | Gurantz | 6,307,862 B1 | 10/2001 | Silverman |
| 5,939,801 | A | 8/1999 | Bouffard et al. | 6,308,240 B1 | 10/2001 | De Nicolo |
| 5,944,831 | A | 8/1999 | Pate et al. | 6,310,781 B1 | 10/2001 | Karam |
| 5,946,047 | A | 8/1999 | Levan | 6,317,884 B1 | 11/2001 | Eames et al. |
| 5,946,048 | A | 8/1999 | Levan | 6,348,874 B1 | 2/2002 | Cole et al. |
| 5,953,344 | A | 9/1999 | Dail et al. | 6,349,133 B1 | 2/2002 | Matthews et al. |
| 5,953,670 | A | 9/1999 | Newson | 6,362,987 B1 | 3/2002 | Yurek et al. |
| 5,960,208 | A | 9/1999 | Obata et al. | 6,363,066 B1 | 3/2002 | Frimodig |
| 5,963,844 | A | 10/1999 | Dail | 6,364,535 B1 | 4/2002 | Coffey |
| 5,968,118 | A | 10/1999 | Sutton | 6,366,143 B1 | 4/2002 | Liu et al. |
| 5,973,942 | A | 10/1999 | Nelson et al. | 6,377,874 B1 | 4/2002 | Ykema |
| 5,974,553 | A | 10/1999 | Gandar | 6,380,852 B1 | 4/2002 | Hartman et al. |
| 5,982,052 | A | 11/1999 | Sosnowski | 6,381,745 B1 | 4/2002 | Paul |
| 5,982,363 | A | 11/1999 | Naiff | 6,389,139 B1 | 5/2002 | Curtis et al. |
| 5,987,303 | A | 11/1999 | Dutta et al. | 6,393,607 B1 | 5/2002 | Hughes et al. |
| 5,990,577 | A | 11/1999 | Kamioka et al. | 6,396,391 B1 | 5/2002 | Binder |
| 5,991,885 | A | 11/1999 | Chang et al. | 6,397,288 B1 | 5/2002 | Rye et al. |
| 5,994,998 | A | 11/1999 | Fisher et al. | 6,400,815 B1 | 6/2002 | Gilboy et al. |
| 6,009,465 | A | 12/1999 | Decker et al. | 6,418,149 B1 | 7/2002 | Swisher et al. |
| 6,010,228 | A | 1/2000 | Blackman | 6,420,964 B1 | 7/2002 | Nishikaws |
| 6,014,386 | A | 1/2000 | Abraham | 6,433,672 B1 | 8/2002 | Shirmard |
| 6,016,519 | A | 1/2000 | Chida et al. | 6,438,109 B1 | 8/2002 | Karaoguz et al. |
| 6,025,945 | A | 2/2000 | Nyu et al. | 6,441,723 B1 | 8/2002 | Mansfield, Jr. et al. |
| 6,028,860 | A | 2/2000 | Laubach et al. | 6,448,899 B1 | 9/2002 | Thompson |
| 6,029,047 | A | 2/2000 | Ishida et al. | 6,449,291 B1 | 9/2002 | Burns et al. |
| 6,032,057 | A | 2/2000 | Kiiski | 6,449,348 B1 | 9/2002 | Lamb et al. |
| 6,033,101 | A | 3/2000 | Reddick et al. | 6,452,923 B1 | 9/2002 | Gerszberg et al. |
| 6,038,457 | A | 3/2000 | Barkat | 6,453,473 B1 | 9/2002 | Watson, Jr. |
| 6,049,471 | A | 4/2000 | Korcharz et al. | 6,459,175 B1 | 10/2002 | Potega |
| 6,049,881 | A | 4/2000 | Massman et al. | 6,459,275 B1 | 10/2002 | Ewalt et al. |
| 6,052,380 | A | 4/2000 | Bell | 6,463,588 B1 | 10/2002 | Jenkins et al. |
| 6,055,242 | A | 4/2000 | Doshi et al. | 6,470,401 B1 | 10/2002 | Peterson |
| 6,055,633 | A | 4/2000 | Schrier et al. | 6,473,608 B1 | 10/2002 | Lehr et al. |
| 6,061,261 | A | 5/2000 | Chen et al. | 6,474,829 B2 | 11/2002 | Clodfelter |
| 6,069,588 | A | 5/2000 | O'Neill, Jr. | 6,475,022 B2 | 11/2002 | Tamino |
| 6,075,787 | A | 6/2000 | Bobeck et al. | 6,477,457 B1 | 11/2002 | Fendt et al. |
| 6,081,519 | A | 6/2000 | Petler | 6,480,122 B1 | 11/2002 | Oddy et al. |
| 6,081,533 | A | 6/2000 | Laubach et al. | 6,481,013 B1 | 11/2002 | Dinwiddie et al. |
| 6,087,835 | A | 7/2000 | Haneda | 6,492,897 B1 | 12/2002 | Mowery, Jr. |
| 6,088,569 | A | 7/2000 | Bach et al. | 6,493,875 B1 | 12/2002 | Eames et al. |
| 6,095,867 | A | 8/2000 | Brandt et al. | 6,496,103 B1 | 12/2002 | Weiss et al. |
| 6,097,761 | A | 8/2000 | Buhring et al. | 6,507,322 B2 | 1/2003 | Fang |
| 6,101,228 | A | 8/2000 | Hebron et al. | 6,513,163 B1 | 1/2003 | Silvia et al. |
| 6,104,727 | A | 8/2000 | Moura et al. | 6,518,724 B2 | 2/2003 | Janik |
| 6,114,632 | A | 9/2000 | Planas, Sr. et al. | 6,522,515 B1 | 2/2003 | Whitney |
| 6,115,468 | A | 9/2000 | De Nicolo | 6,526,581 B1 | 2/2003 | Edson |
| 6,115,755 | A | 9/2000 | Krishan | 6,529,443 B2 | 3/2003 | Downey, Jr. et al. |
| 6,115,822 | A | 9/2000 | Kim et al. | 6,535,480 B1 | 3/2003 | Bhagavath et al. |
| 6,123,577 | A | 9/2000 | Contois et al. | 6,535,983 B1 | 3/2003 | McCormack et al. |
| 6,125,448 | A | 9/2000 | Schwan et al. | 6,541,878 B1 | 4/2003 | Diab |
| 6,137,793 | A | 10/2000 | Gorman et al. | 6,543,940 B2 | 4/2003 | Chu |

| | | |
|---|---|---|
| 6,546,017 B1 | 4/2003 | Khaunte |
| 6,546,494 B1 | 4/2003 | Jackson et al. |
| 6,553,076 B1 | 4/2003 | Huang |
| 6,553,568 B1 | 4/2003 | Fijolek et al. |
| 6,556,564 B2 | 4/2003 | Rogers |
| 6,560,319 B1 | 5/2003 | Binder |
| 6,571,181 B1 | 5/2003 | Rakshani et al. |
| 6,574,741 B1 | 6/2003 | Fujimori et al. |
| 6,577,642 B1 | 6/2003 | Fijolek et al. |
| 6,581,208 B1 | 6/2003 | Inaguma |
| 6,587,454 B1 | 7/2003 | Lamb |
| 6,587,479 B1 | 7/2003 | Bianchi et al. |
| 6,601,097 B1 | 7/2003 | Cheston et al. |
| 6,603,220 B2 | 8/2003 | Vergnaud |
| 6,614,236 B1 | 9/2003 | Karam |
| 6,615,407 B1 | 9/2003 | Inaguma |
| 6,618,353 B2 | 9/2003 | Merrill et al. |
| 6,618,387 B1 | 9/2003 | Liu et al. |
| 6,622,304 B1 | 9/2003 | Carhart |
| 6,637,030 B1 | 10/2003 | Klein |
| 6,640,308 B1 | 10/2003 | Keyghobad et al. |
| 6,643,566 B1 | 11/2003 | Lehr et al. |
| 6,648,308 B2 | 11/2003 | Gunnar Rothoff |
| 6,650,622 B1 | 11/2003 | Austerman, III et al. |
| 6,653,932 B1 | 11/2003 | Beamish et al. |
| 6,658,010 B1 | 12/2003 | Enns et al. |
| 6,658,109 B1 | 12/2003 | Steinke et al. |
| 6,681,013 B1 | 1/2004 | Miyamoto |
| 6,690,677 B1 | 2/2004 | Binder |
| 6,697,864 B1 | 2/2004 | Demirtjis et al. |
| 6,701,443 B1 | 3/2004 | Bell |
| 6,710,553 B2 | 3/2004 | Lagan |
| 6,715,087 B1 | 3/2004 | Vergnaud et al. |
| 6,721,298 B1 | 4/2004 | Vella-Coleiro |
| 6,732,368 B1 | 5/2004 | Michael et al. |
| 6,738,641 B1 | 5/2004 | Elsasser |
| 6,745,392 B1 | 6/2004 | Basawapatna et al. |
| 6,747,859 B2 | 6/2004 | Walbeck et al. |
| 6,748,080 B2 | 6/2004 | Russ et al. |
| 6,751,441 B1 | 6/2004 | Murray et al. |
| 6,762,675 B1 | 7/2004 | Cafiero et al. |
| 6,764,343 B2 | 7/2004 | Ferentz |
| 6,765,149 B1 | 7/2004 | Ku |
| 6,765,931 B1 | 7/2004 | Rabenko et al. |
| 6,778,817 B1 | 8/2004 | Bullock et al. |
| 6,781,530 B2 | 8/2004 | Moore |
| 6,800,957 B2 | 10/2004 | Nerone et al. |
| 6,804,351 B1 | 10/2004 | Karam |
| 6,819,682 B1 | 11/2004 | Rabenko et al. |
| 6,822,946 B1 | 11/2004 | Wallace |
| 6,834,057 B1 | 12/2004 | Rabenko et al. |
| 6,838,997 B1 | 1/2005 | Davidson |
| 6,841,979 B2 | 1/2005 | Berson et al. |
| 6,842,459 B1 | 1/2005 | Binder |
| 6,848,116 B1 | 1/2005 | Land |
| 6,854,895 B2 | 2/2005 | Coffey et al. |
| 6,856,799 B1 | 2/2005 | Ritter |
| 6,857,132 B1 | 2/2005 | Rakib et al. |
| 6,864,798 B2 | 3/2005 | Janik |
| 6,868,058 B1 | 3/2005 | Cooper et al. |
| 6,868,265 B2 | 3/2005 | Zodnik |
| 6,870,282 B1 | 3/2005 | Bischoff et al. |
| 6,880,020 B1 | 4/2005 | Rubinstein et al. |
| 6,901,439 B1 | 5/2005 | Bonasia et al. |
| 6,906,618 B2 | 6/2005 | Hair, III et al. |
| 6,907,458 B2 | 6/2005 | Tamassetti |
| 6,912,145 B2 | 6/2005 | Hung et al. |
| 6,912,209 B1 | 6/2005 | Thi et al. |
| 6,912,282 B2 | 6/2005 | Karam |
| 6,931,659 B1 | 8/2005 | Kinemura |
| 6,932,624 B1 | 8/2005 | Hoopes |
| 6,933,686 B1 | 8/2005 | Bishel |
| 6,934,300 B2 | 8/2005 | Tamasetti |
| 6,940,956 B1 | 9/2005 | Leach |
| 6,941,576 B2 | 9/2005 | Amit |
| 6,943,296 B2 | 9/2005 | Perret |
| 6,943,683 B2 | 9/2005 | Perret |
| 6,946,988 B2 | 9/2005 | Edwards |
| 6,954,863 B2 | 10/2005 | Mouton |
| 6,955,560 B1 | 10/2005 | Biggs |
| 6,956,462 B2 | 10/2005 | Jetzt |
| 6,956,826 B1 | 10/2005 | Binder |
| 6,961,303 B1 | 11/2005 | Binder |
| 6,963,931 B2 | 11/2005 | Bunn et al. |
| 6,973,394 B2 | 12/2005 | Jaeger et al. |
| 6,975,209 B2 | 12/2005 | Gromov |
| 6,977,507 B1 | 12/2005 | Pannell et al. |
| 6,981,892 B1 | 1/2006 | Kostalnik |
| 6,986,071 B2 | 1/2006 | Darshan et al. |
| 6,993,289 B2 | 1/2006 | Janik |
| 6,996,458 B2 | 2/2006 | Pincu et al. |
| 6,996,837 B1 | 2/2006 | Miura et al. |
| 7,002,898 B1 | 2/2006 | Lou |
| 7,003,102 B2 | 2/2006 | Kiko |
| 7,023,809 B1 | 4/2006 | Rubenstein |
| 7,023,868 B2 | 4/2006 | Rabenko et al. |
| 7,026,730 B1 | 4/2006 | Marshall et al. |
| 7,027,483 B2 | 4/2006 | Santhoff |
| 7,030,733 B2 | 4/2006 | Abbarin |
| 7,034,225 B2 | 4/2006 | Thompson |
| 7,035,270 B2 | 4/2006 | Moore, Jr. et al. |
| 7,036,140 B2 | 4/2006 | Terry et al. |
| 7,039,724 B1 | 5/2006 | Lavian et al. |
| 7,046,983 B2 | 5/2006 | Elkayam et al. |
| 7,047,555 B1 | 5/2006 | Inaguma et al. |
| 7,049,514 B2 | 5/2006 | Brandt et al. |
| 7,053,501 B1 | 5/2006 | Barrass |
| 7,061,142 B1 | 6/2006 | Marshall |
| 7,068,781 B1 | 6/2006 | Le Creff et al. |
| 7,072,995 B1 | 7/2006 | Burroughs |
| 7,079,647 B2 | 7/2006 | Tomobe |
| 7,081,827 B2 | 7/2006 | Addy |
| 7,088,238 B2 | 8/2006 | Karaoguz et al. |
| 7,089,126 B2 | 8/2006 | Muir |
| 7,099,368 B2 | 8/2006 | Santhoff et al. |
| 7,106,388 B2 | 9/2006 | Vorenkamp et al. |
| 7,106,721 B1 | 9/2006 | Binder |
| 7,116,685 B2 | 10/2006 | Brown et al. |
| 7,117,520 B2 | 10/2006 | Stewart |
| 7,138,886 B2 | 11/2006 | Strull et al. |
| 7,142,560 B2 | 11/2006 | Mansfield |
| 7,149,474 B1 | 12/2006 | Mikhak |
| 7,151,575 B1 | 12/2006 | Landry et al. |
| 7,164,690 B2 | 1/2007 | Limb et al. |
| 7,209,497 B2 | 4/2007 | Weinstein et al. |
| 7,281,040 B1 | 10/2007 | Ly |
| 7,295,518 B1 | 11/2007 | Monk et al. |
| 7,317,793 B2 | 1/2008 | Binder |
| 6,927,340 B1 | 8/2008 | Binder |
| 6,937,056 B2 | 8/2008 | Binder |
| 2001/0030470 A1 | 10/2001 | Waugh |
| 2001/0036199 A1 | 11/2001 | Terry |
| 2001/0039660 A1 | 11/2001 | Vasilevsky et al. |
| 2001/0040918 A1 | 11/2001 | Krinsky et al. |
| 2002/0019875 A1 | 2/2002 | Garrett et al. |
| 2002/0031114 A1 | 3/2002 | Terry et al. |
| 2002/0035624 A1 | 3/2002 | Kim |
| 2002/0038153 A1 | 3/2002 | Amodeo |
| 2002/0039388 A1 | 4/2002 | Smart et al. |
| 2002/0061012 A1 | 5/2002 | Thi et al. |
| 2002/0063584 A1 | 5/2002 | Molenda et al. |
| 2002/0069417 A1 | 6/2002 | Kliger et al. |
| 2002/0075806 A1 | 6/2002 | Shalvi et al. |
| 2002/0104009 A1 | 8/2002 | Zodnik |
| 2002/0116720 A1 | 8/2002 | Terry et al. |
| 2002/0118664 A1 | 8/2002 | Ishibashi et al. |
| 2002/0150155 A1 | 10/2002 | Florentin et al. |
| 2002/0161912 A1 | 10/2002 | Vasquez et al. |
| 2002/0166124 A1 | 11/2002 | Gurantz et al. |
| 2002/0166125 A1 | 11/2002 | Fulmer, II |
| 2002/0174423 A1 | 11/2002 | Fifield et al. |
| 2002/0194383 A1 | 12/2002 | Cohen et al. |
| 2002/0194605 A1 | 12/2002 | Cohen et al. |
| 2003/0005450 A1 | 1/2003 | Smith |
| 2003/0018975 A1 | 1/2003 | Stone |
| 2003/0035471 A1 | 2/2003 | Pitsoulakis |
| 2003/0039257 A1 | 2/2003 | Manis |
| 2003/0053443 A1 | 3/2003 | Owens |

| | | |
|---|---|---|
| 2003/0061522 A1 | 3/2003 | Ke et al. |
| 2003/0062990 A1 | 4/2003 | Schaeffer, Jr. et al. |
| 2003/0066082 A1 | 4/2003 | Kliger et al. |
| 2003/0087646 A1 | 5/2003 | Funato et al. |
| 2003/0099228 A1 | 5/2003 | Alcock |
| 2003/0106067 A1 | 6/2003 | Hoskins et al. |
| 2003/0112965 A1 | 6/2003 | McNamara et al. |
| 2003/0123462 A1 | 7/2003 | Kusayanagi |
| 2003/0133476 A1 | 7/2003 | Stone et al. |
| 2003/0151695 A1 | 8/2003 | Sahlin et al. |
| 2003/0154273 A1 | 8/2003 | Caveney |
| 2003/0154276 A1 | 8/2003 | Caveney |
| 2003/0161333 A1 | 8/2003 | Schain et al. |
| 2003/0224728 A1 | 12/2003 | Heinonen et al. |
| 2004/0013098 A1 | 1/2004 | Tseng et al. |
| 2004/0033817 A1 | 2/2004 | Gorsulch |
| 2004/0073597 A1 | 4/2004 | Caveney et al. |
| 2004/0077310 A1 | 4/2004 | Levy |
| 2004/0083262 A1 | 4/2004 | Trantow |
| 2004/0085976 A1 | 5/2004 | Dale et al. |
| 2004/0087214 A1 | 5/2004 | Cho |
| 2004/0121648 A1 | 6/2004 | Voros |
| 2004/0123322 A1 | 6/2004 | Erkocevic et al. |
| 2004/0125819 A1 | 7/2004 | Binder |
| 2004/0136384 A1 | 7/2004 | Cho |
| 2004/0146061 A1 | 7/2004 | Bisceglia et al. |
| 2004/0147232 A1 | 7/2004 | Zodnik |
| 2004/0158649 A1 | 8/2004 | Ophir et al. |
| 2004/0162117 A1 | 8/2004 | Liebenow |
| 2004/0164619 A1 | 8/2004 | Parker et al. |
| 2004/0177381 A1 | 9/2004 | Kliger et al. |
| 2004/0178888 A1 | 9/2004 | Hales et al. |
| 2004/0187156 A1 | 9/2004 | Palm et al. |
| 2004/0192285 A1 | 9/2004 | Capobianco et al. |
| 2004/0198236 A1 | 10/2004 | Paine et al. |
| 2004/0203387 A1 | 10/2004 | Grannan |
| 2004/0204017 A1 | 10/2004 | Eckel et al. |
| 2004/0230846 A1 | 11/2004 | Mancey et al. |
| 2004/0232768 A1 | 11/2004 | Hung et al. |
| 2004/0236967 A1 | 11/2004 | Korcharz et al. |
| 2004/0255332 A1 | 12/2004 | Bertonis et al. |
| 2004/0259538 A1 | 12/2004 | Agbegnenow |
| 2004/0268160 A1 | 12/2004 | Atkinson et al. |
| 2005/0010954 A1 | 1/2005 | Binder |
| 2005/0018648 A1 | 1/2005 | Scheelke |
| 2005/0018857 A1 | 1/2005 | McCarty et al. |
| 2005/0034159 A1 | 2/2005 | Ophir et al. |
| 2005/0038875 A1 | 2/2005 | Park |
| 2005/0047379 A1 | 3/2005 | Boyden et al. |
| 2005/0047431 A1 | 3/2005 | Binder |
| 2005/0053087 A1 | 3/2005 | Pulyk |
| 2005/0063108 A1 | 3/2005 | Voll et al. |
| 2005/0073968 A1 | 4/2005 | Perlman |
| 2005/0076148 A1 | 4/2005 | Chan et al. |
| 2005/0076149 A1 | 4/2005 | McKown et al. |
| 2005/0076151 A1 | 4/2005 | Tapperson et al. |
| 2005/0076375 A1 | 4/2005 | Nakamura |
| 2005/0078700 A1 | 4/2005 | Thompson et al. |
| 2005/0084004 A1 | 4/2005 | Bione |
| 2005/0086389 A1 | 4/2005 | Chang |
| 2005/0086694 A1 | 4/2005 | Hicks et al. |
| 2005/0097369 A1 | 5/2005 | Bowser et al. |
| 2005/0125083 A1 | 6/2005 | Kiko |
| 2005/0125507 A1 | 6/2005 | Atias et al. |
| 2005/0129069 A1 | 6/2005 | Binder |
| 2005/0136972 A1 | 6/2005 | Smith et al. |
| 2005/0136989 A1 | 6/2005 | Dove |
| 2005/0144647 A1 | 6/2005 | Zussman et al. |
| 2005/0152306 A1 | 7/2005 | Bonnassieux et al. |
| 2005/0152323 A1 | 7/2005 | Bonnassieux et al. |
| 2005/0152337 A1 | 7/2005 | Wurtzel et al. |
| 2005/0177640 A1 | 8/2005 | Rubinstein et al. |
| 2005/0184915 A1 | 8/2005 | Nagel et al. |
| 2005/0201306 A1 | 9/2005 | Engel |
| 2005/0208825 A1 | 9/2005 | Chan |
| 2005/0228889 A1 | 10/2005 | Cohen et al. |
| 2005/0235333 A1 | 10/2005 | Bertonis et al. |
| 2005/0245127 A1 | 11/2005 | Nordin |
| 2005/0268120 A1 | 12/2005 | Schindler et al. |
| 2005/0272372 A1 | 12/2005 | Rodriguez |
| 2005/0273790 A1 | 12/2005 | Kearney |
| 2005/0281326 A1 | 12/2005 | Yu |
| 2005/0289638 A1 | 12/2005 | Steading |
| 2006/0006817 A1 | 1/2006 | Chason |
| 2006/0020525 A1 | 1/2006 | Borelli et al. |
| 2006/0053324 A1 | 3/2006 | Giat et al. |
| 2006/0079969 A1 | 4/2006 | Sequin |
| 2006/0089230 A1 | 4/2006 | Biederman et al. |
| 2006/0092967 A1 | 5/2006 | Bergeron et al. |
| 2006/0104291 A1 | 5/2006 | Rodriguez |
| 2006/0165097 A1 | 7/2006 | Caveney |
| 2006/0168459 A1 | 7/2006 | Dwelley et al. |
| 2006/0181398 A1 | 8/2006 | Martich et al. |
| 2006/0193336 A1 | 8/2006 | Landry et al. |
| 2006/0222086 A1 | 10/2006 | Frye, Jr. |
| 2006/0251094 A1 | 11/2006 | Van Vleck et al. |
| 2006/0280197 A1 | 12/2006 | Stone |
| 2006/0281326 A1 | 12/2006 | Yu |
| 2006/0291575 A1 | 12/2006 | Berkman et al. |
| 2007/0036171 A1 | 2/2007 | Magin |
| 2008/0175256 A1 | 7/2008 | Binder |

FOREIGN PATENT DOCUMENTS

| | | |
|---|---|---|
| EP | 0 241 152 A2 | 10/1987 |
| EP | 0355532 | 2/1990 |
| EP | 0385695 | 9/1990 |
| EP | 0 961 466 | 12/1999 |
| EP | 1 343 253 A1 | 9/2003 |
| GB | 2 301 743 A | 12/1996 |
| GB | 2 368 979 A | 5/2002 |
| JP | 55132197 A2 | 10/1980 |
| WO | 9623377 A1 | 8/1996 |
| WO | WO 96/23377 | 8/1996 |
| WO | WO 97/50193 A1 | 12/1997 |
| WO | 98/27748 | 6/1998 |
| WO | 98/31133 | 7/1998 |
| WO | WO 98/37648 A1 | 8/1998 |
| WO | 9857483 | 12/1998 |
| WO | WO 99/03255 A1 | 1/1999 |
| WO | WO 99/12330 A1 | 3/1999 |
| WO | 99/35753 | 7/1999 |
| WO | WO 99/53627 | 10/1999 |
| WO | WO 00/07322 A2 | 2/2000 |
| WO | 00/28689 | 5/2000 |
| WO | WO 01/43238 A1 | 6/2001 |
| WO | WO 01/71980 A1 | 9/2001 |
| WO | 01/80030 | 10/2001 |
| WO | 02/19623 | 3/2002 |
| WO | WO 02/065229 A2 | 8/2002 |
| WO | WO 02/091652 A2 | 11/2002 |
| WO | WO 02/102019 A2 | 12/2002 |
| WO | WO 2004/068827 A1 | 8/2004 |
| WO | WO 2005/022692 A2 | 3/2005 |
| WO | 2006/052216 | 5/2006 |

OTHER PUBLICATIONS

Universal Serial Bus Specification—Rev. 1.0, Jan. 15, 1996; Sec. 7.2.1-7.2.1.5 pp. 131-136. cited by other.

Universal Serial Bus Specification—Rev. 1.0, Jan. 15. 1996; Sec. 9.2.1-9.2.5.1 pp. 170-171. cited by other.

Universal Serial Bus Specification—Rev. 1.0, Jan. 15, 1996; Sec. 9.6.2 pp. 184-185. cited by other.

Bearfield, J.M., "Control the Power Interface of USB's Voltage Bus", Electronic Design, U.S., Penton Publishing, Clev. Ohio, vol. 45, No. 15, Jul. 1997, p. 80-86. cited by other.

RAD Data Comm. Ltd., "Token Ring Design Guide". 1994, #TR-20-01/94, Chapters 1 through 4-21. cited by other.

PowerDsine Product Catalogue 1999, pp. 56-79 and 95-105, Israel. cited by other.

Gershon, E.; "FDDI on Copper with AMD PHY Components"; Advanced Micro Devices, Inc.; 1991, pp. 1-7.

Lavoisard, J.L. et al; "ISDN Customer Equipments"; Commutation and Transmission, No. 3, 1987, pp. 35-50.

Keller et al; "Performance Bottlenecks in Digital Movie Systems"; Proceedings of the 4th International Workshop on Network and Operating System Support for Digital Audio and Video, 1993, pp. 161-172.

Stallings. W.; "Local Networks—An Introduction" pp. ii, xii-xvi, 373-381, 1984.
Stallings, W.; "Local Networks—Second Edition" pp. I-v, viii-xiv, 427-434. 1987.
Stallings, W.; "Local Networks—Third Edition" pp. I-v, x-xvi, 499-510. 1990.
Strole, N.; "The IBM Token-Ring Network—A functional Overview"; ; IEEE Network Magazine, vol. 1, No. 1, 1987, pp. 23-30.
Willett, M.; "Token-ring Local Area Networks—An Introduction"; IEEE Network Magazine, vol. 1, No. 1, 1987, pp. 8 and 9.
"Integrated Services Digital Network (ISDN)", International Telecommunications Union, vol. III, Fascicle III.8, pp. 175-176 and 204-209, 1988.
An Interoperable Solution for FDDI Signaling Over Shielded Twisted Pair; Advanced Micro Devices, Inc.; May 1991, pp. 1-16.
SuperStack II Baseline Switch, 14-Port TP (3C16460) User Guide; 3Com; 1996 pp. 1-8.
SuperStack II Entry Hub User Guide; 3Com; 1996 pp. 1-8.
SuperStack II Baseline Switch 610 User Guide; 3Com; 1999, pp. 1-48.
SuperStack II Baseline 10/100 Switch User Guide; 3Com; 1998, pp. 1-8.
Cisco Catalyst 5000 Switching System: http://web/19961220170336/www.cisco.com; pp. 1-4, 1996.
Cisco Catalyst 5000 Series Documentation; http://web.archive.org/web/19961220192608/www.cisco.com; pp. 1-11, 1996.
Cisco Catalyst 5000 Group Switching Ethernet Modules; http://web.archive.org/web/19961220192604/www.cisco.com; pp. 1-5, 1996.
Cisco Catalyst 5000: Industry's First Modular, Multilayer-Capable Switching System for the Wiring Closet; http://web.archive.org/web/19961220192714/www.cisco.com; pp. 1-22, 1996.
Cisco Catalyst 5000 ATM Dual PHY LAN Emulation Module; http://web.archive.org/web/19961220191454/www.cisco.com; pp. 1-4, 1996.
Cisco LAN Emulation; http://web.archive.org/web/19961220192930/www.cisco.com; pp. 1-16, 1996.
Cisco Fast Ethernet 100-Mbps Solutions; http://web.archive.org/web/19961220192936/www.cisco.com; pp. 1-10, 1996.
Cisco Catalyst 5000: Industry's First Modular, Multilayer-Capable Switching System for the Wiring Closet; Cisco Systems, 1996. pp. 1-22.
3Com NBX 2101PE Basic Phone Product Details; http://www.3com.com/products/enUS/printssafe.jsp?sku=3C102483PE&pathtype=support; pp. 1-3.
The Mac Reborn; Macworld, vol. 13, issue 9. Sep. 1996, pp. 1-10.
SuperStack II Desktop Switch; 3Com, 1996, 2 pages.
CiscoPro Ether Switch CPW2115; Cisco Systems; 1995, 4 pages.
Hart Field Communication Protocol—an introduction for users and manufacturers; Hart Communication Foundation, 1995, 12 pages.
3ComImpactIQ External ISDN Modem; 3COM, 1996, 4 pages.
The Macintosh Reborn, Macworld—The Essential Macintosh Resource; 1996, 16 pages.
Cisco 2610 Router Cabling and Setup—Quick Start Guide; Cisco Systems, 1998, 18 pages.
Network Based Exchange—The Complete Communication Solution; NBX Corporation, 1997, 16 pages.
-48- Volt DC Power Supply Connection Guide, For the SuperStack II Switch 3900; Mar. 2000, pp. 1-9.
Donnan, et al; "Token Ring Access Method and Physical Layer Specifications"; ANSI/IEEE Standard for Local Networks; ANSI/IEEE 802.5; 89 pages, 1985.
Gibson et al; Fibre Data Distributed Interface (FDDI)—Token Ring Physical Layer Medium Dependent (PMD); American National Standard for Information Systems; ANSI X3.166-1990; 58 pages, 1990.
Gibson et al; Fiber Distributed Data Interface (FDDI)—Token Ring Physical Layer Protocol (PHY); American National Standard for Information Systems; ANSI X3.148-1988; 34 pages, 1988.
Lohse, et al; Fiber Distributed Data Interface (FDDI)—Token Ring Media Access Control (MAC); American National Standard for Information Systems; ANSI X3.139-1987; 62 pages; 1987.
IEEE Standard for a High Performance Serial Bus; IEEE Std. 1394-1995; 1996; 392 pages.

SuperStack II PS Hub User Guide; 3com; Jul. 1997; 188 pages.
SuperStack II Desktop Switch User Guide; 3Com; Jun. 1997; 148 pages.
Universal Serial Bus Specification Revison 1.0: Jan. 1996; 268 pages.
ComImpact IQ External ISDN Modem User Guide; Jul. 1997; 158 pages.
Stallings, W., Local Networks, An Introduction, pp. 1-97, 1984.
Grayson Evans, The CEBUs Standard Users Guide, 1st edition, May 1996, 317 pages.
Mark Hachman, Compaq to Ride the CEBus, EBN, Jan. 22, 1996, 1 page.
Home Automation Buses: Protocols Really Hit Home, EDN, Apr. 13, 1995, 9 pages.
Brian E. Markwalter, et al; CEBus Router Testing, IEEE Transactions on Conusmer Electronics, Nov. 1991, vol. 37, No. 4, 8 pages.
Draft IS-60.04 Node Communications Protocol Part 6: Applicaiton Layer Specification, Rev. Apr. 18, 1996, 129 pages.
M. Ise, et al., "Sharp Home Bus System," Sharp Technical Journal, No. 29, 1984, pp. 49-55.
S. Tsuruta, "Home Media Bus: An Integrated Network for Home Information Systems," 1984 IEEE International Conference on Consumer Electronics. Digest of Technical Papers, Jun. 6-8, 1984, Rosemont, Illinois, 2 pp.
C. Dougligeris, et al., "Communications and Control for a Home Automation System," Conference: IEEE Proceedings of the Southeastcon '91, vol. 1, pp. 171-175.
D.G.J. Fanshawe, "Architures for Home Systems," Conference: IEEE Colloquium on Home Systems—Information, Entertainment and Control, Oct. 1, 1990, London, United Kingdom, pp. 3/1-3/3.
M. Inoue, et al., "A Home Automation System," IEEE Transactions on Consumer Electronics, vol. CE-31, No. 3, Aug. 1985, pp. 516-527.
"CEBus: US Households are Being Networked," Funkschau, No. 9, Apr. 1989, pp. 45-47.
Coaxial Feeder Cables [Engineering Notes], PYE Telecommunications Limited Publication Ref No. TSP507/1, Jun. 1975, Cambridge, England, 15 pages.
Freeman, "Telecommunication Transmission Handbook," 2.sup.nd Ed., Cover, pp. xi-xxvii, Chapter 3 (pp. 79-127), Chapter 5 (pp. 172-252), Chapter 6 (pp. 253-288), 1981.
Hoe-Young Noh, "Home Automation," Korea Information Science Society Review, Apr. 1989, vol. 7 No. 2, pp. 40-44, Republic of Korea. (Translation Provided).
007364-007413 EIA-600.33 Coax Cable Physical Layer & Medium Specification; Revision: IS-60, Sep. 25, 1995 (50 pages).
012891-012893 Motorola Announces Key New Features to CyberSURFR Cable Modem System; Motorola, Mar. 17, 1997 (3 pages).
012894-012897 CyberSURFR Cable Modem Specifications; Motorola, Mon. Apr. 13, 1998 (4 pages).
'High-Speed Cable Modems', pp. 1-246 by Albert A. Azzam, 1997, ISBN: 0-07-006417-2 (276 pages).
'High-Speed Cable Modems', pp. 247-570 by Albert A. Azzam, 1997, ISBN: 0-07-006417-2 (321 pages).
Mark Sumner: "DOCSIS 1.1 Overview" CABLEMODEM.COM—Documents, Online! May 3-7, 1999, pp. 1-16, XP-002165493, http://www.cablemodem.com/Euroll.sub.—Overview.pdf, retrieved on Apr. 18, 2001.
Sdralia et al, "Performance Characterisation of the MCNS DOCSIS 1.0 CATV Protocol with Prioritised First come First Served Scheduling", IEEE Transactions on Broadcasting, US, vol. 45, No. 2, Jun. 1999, pp. 196-205.
Tzerefos et al, "Delivery of Low Bit Rate Isochronous Streams Over the DOCSIS 1.0 Cable Television Protocol", IEEE Transactions on Broadcasting, US, vol. 45, No. 2, Jun. 1999, pp. 206-214.
A.D. Little, S. Lipoff: "Cable Modem Termination System—Network Side Interface Specification" Data Over Cable Interface Specification, Online 1996, pp. 1-17, XP002165494, http://www.cablemodem.com/SP.sub.—CMTS.sub.—NSII01-960702.pdf, retrieved on Apr. 18, 2001.
M. Laubach, "To foster residential area broadband internet techology: IP datagrams keep going, and going, and going . . . ", Computer Communications, NL, Elsevier Science Publishers BV, Amsterdam, vol. 19, No. 11, Sep. 1, 1996, pp. 867-875.

Goldberg, "MCNS/DOCSIS MAC Clears a Path for the Cable-Modem Invasion", Electronic Design, US, Penton Publishing, vol. 45, No. 27, Dec. 1, 1997, pp. 69-70, 74, 78, 80.
Quigley, "Cablemodem Standards for Advanced Quality of Service Deployments", Digest of Technical Papers, International Conference on Consumer Electronics, Jun. 22-24, 1999, pp. 282-283.
Cable Television Laboratories, Inc., "Data-Over-Cable Service Interface Specifications: Baseline Privacy Plus Interface Specification", SP-BPI+-I09-020830, Aug. 30, 2002.
Cable Television Laboratories, Inc., "Data-Over-Cable Service Interface Specifications: Radio Frequency Interface Specification", SP-RFIv1.1-I09-020830, Aug. 30, 2002.
Cable Television Laboratories, Inc., "Data-Over-Cable Service Interface Specifications: Radio Frequency Interface Specification", SP-RFIv2.0-I03-021218, Dec. 18, 2002.
Cisco, "Internal DOCSIS Configurator File Generator for the Cisco Cable Modem Termination System", Cisco Cable Modem Termination System Feature Guide, Chapter 6.
Communications Technology, "Cable Modem Security: Insulating Your Network While Keeping Your Subscribers Safe from Each Other", Oct. 2001.
Croft et al, "Bootstrap Protocol (BOOTP)", Sep. 1985.
Droms, "Dynamic Host Configuration Protocol", Mar. 1997.
Jacobs, et al, "Bandwidth Burglary in Broad Daylight: How to Prevent a Simple Hack", Jan. 2003.
Pfendtner, "DOCSIS Network Security at WH-Netz", Nov. 20, 2002.
Society of Cable Telecommunications Engineers, Inc., "Data-Over-Cable Service Interface Specification: DOCSIS 1.0 Radio Frequency Interface (RFI)", ANSI/SCTE 22-1 2002 (formerly DSS 02-05).
"MCNS Data-Over-Cable Service Interface Specifications: Baseline Privacy Interface Specification SP-BPI-I02-990319", Mar. 1999.
Cable Television Laboratories, Inc.; Data-Over-Cable Service Interface Specifications—Radio Frequency interface Specification—SP-RFI-104-980724; 1997; pp. 1-196.
"MCNS Data-Over-Cable Service interface Specifications: Cable Modem to Customer Premise Equipment Interface Specification SP-CMCI-I04-000714", Jul. 2000.
"Data-Over-Cable Service interface Specifications: Cable Modem Termination System—Network Side Interface Specification, SP-CMTS-NSII01-960702", Jul. 1996.
Data-Over Cable Service interface Specifications; Radio Frequency interface Specification; SPRFIv1.1-101-990311; 1999; Cable Television Laboratories, Inc.; pp. 1-310.
Ciciora, W., et al., "Protocol Issues," Modern Cable Television Technology: Video, Voice, and Data Communications, Section 4.4, pp. 194-205, Copyright 1999 by Morgan Kaufmann Publishers, Inc.
Ciciora, W., et al, "Chapter 4.5: The DOCSIS Protocol for Cable Modems," Modern Cable Television Technology: Video, Voice, and Data Communications, Section 4.5, pp. 205-213, Copyright 1999 by Morgan Kaufmann Publishers, Inc.
Data-Over Cable Technical Reports; Operations Support System Framework for Data Over Cable Services; TR-DOCS-OSSIW08-961016; MCNS Holdings, LP; pp. 1-20.
Data-Over Cable Service Interface Specifications; Operations Support System Onterface Specification; SP-OSSI-102-990113; Cable Television Laboratories, Inc.; pp. 1-26.
Data-Over Cable Service Interface Specifications; Operations Support System Interface Specification Radio Frequency Interface; SP-OSSI-RFI-I03-990113; Cable Television Laboratories, Inc.; pp. 1-29.
Data-Over Cable Service Interface Specifications; Operations Support System Interface Specification Baseline Privacy Interface MIB; SP-OSSI-BPI-I01-980331; 1997 & 1998; MCNS Holdings, LP; pp. 1-33.
Extended DQRAP (EXQRAP) A Cable TV Protocol Functioning as a Distributed Switch; Chien-Ting Wu & Graham Campbell; Illinois Institute of Technology (Comp. Science Dept.); pp. 1-7.
A Review of Contention Resolution Algorithms for IEEE 802.14 Networks; Nada Glomie; Yves Saintillan, & David H. Su; National Institute of Standards and Technology; pp. 1-11.
A Review of Contention Resolution Algorithms for IEEE 802.14 Networks; Nada Glomie; Yves Saintillan, & David H. Su; National Institute of Standards and Technology; pp. 1-12.
On IEEE 802.14 Medium Access Control Protocol; Ying-Dar Lin; 1998.
On IEEE 802.14 Medium Access Control Protocol; Ying-Dar Lin; 1998; IEEE Communications Survey Fourth Quarter pp. 2-10.
Hybrid-Fiber Coax; Hung Nguyen and Felix Yao; Apr. 22, 1996; pp. 1-11.
Cable Data Modem Performance Evaluation, A Primer for Non-Technical Readers; Cable Television Laboratories, Inc.; Nov. 15, 1996; pp. 1-8.
Data-Over Cable Service Interface Specifications: Cable Modem to Customer Premise Equipment Interface Specification; SP-CMCI-12-980317; 1988; Cable Television Laboratories, Inc.; pp. 1-40.
Cable Device Management Information Base for DOCSIS Complaint Cable Modems and Cable Modem Termination Systems; Michael St. Johns; Mar. 30, 1999; pp. 1-54.
Data-Over Cable Service Interface Specifications; Cable Modem Telephony Return Interface Specification; SP-CMTRI-101-970804; 1997; Cable Television Laboratories, Inc.; pp. 1-74.
Radio Frequency (RF) Interface Management Information Base for MCNS Complaint RF Interfaces Draft-ietf-Jipcdn-rf-interface-mib-04.txt; May 22, 1009; Guenter Roeck (editor); pp. 1-55.
Cable Device Management Information Base for MCNS Complaint Cable Modems and Cable Modem Termination Systems draft-ietf-ipcdn-cable-device-mib-04.txt; May 22, 1998; Guenter Roeck (editor); pp. 1-32.
Baseline Privacy Interface Management Information Base for MCNS Complaint Cable Modems and Cable Modem Termination Systems; R. Woundy; Jan. 17,1999; pp. 1-35.
Logical IP Subnetworks over IEE 802.14 Services; Mark Laubach; Mar. 13, 1998; pp. 1-13.
MAC Protocols for Multimedia Data over HFC Architecture; Dolors Sala Bathe; Nov. 27, 1995; pp. 1-28.
An Access Protocol to Support Multimedia Traffic Over Hybrid Fiber/Coax Systems; John O. Limb, Dolors Sala; pp. 1-6.
Radio Frequency (RF) Interfaces Management Information Base for MCNS/DOCSIS Compliant RF Interfaces; Mike St. Johns, (Editor); Feb. 17, 1999; pp. 1-67.
Telephony-Return Interface (TRI) Management Information Base for DOCSIS complaint Telephony-Return Cable Modems and Cable Modem Termination systems; S. Adiraju, J. Fijolek; Apr. 2, 1999; pp. 1-27.
Data Over Cable System Quality of Service Management Information Base (DOCSIS-QOS MIB); M. Patrick, J. Harvey, Motorola ING; Jun. 25, 1999, pp. 1-43.
Docsis 1.1 IGMP MIB; H. Abramson, Motorola; Jun. 1999; pp. 1-13.
Scheduling Disciplines for HFC Systems: What can we learn from ATM scheduling; Dolors Sala, John O. Limb; GA Tech; pp. 1-6.
A Protocol for Efficient Transfer of Data over Fiber/Cable Systems; Dolors Sala, John O. Limb; GA Tech; pp. 1-8.
Claim Chart presented in request for reexamination of U.S. Patent No. 6,480,510 request filed Jun. 10, 2009.
Claim Chart presented in request for reexamination of U.S. Patent No. 5,841,360 request filed May 26, 2009.
Cisco Catalyst 5002 Switching System Data sheet; Cisco Systems, 1999, 4 pages.
Cisco Catalyst 5000 Series; Cisco Systems, 1996, pp. 589-600.
Cisco Catalyst 5000 Group Switching Ethernet Modules Data Sheet; Cisco Systems, 1996, 9 pages.
Network Based Exchange—The Complete Communications Solution, NBX Corporation, 1997,16 pages.
J. Hofmann, Cable, Television, and the Consumer Electronic Bus, Symposium Record, 15th International TV Symposium, Jun. 11, 1987, Montreux, Switzerland.
ITU-T 1.430 Integrated Services Digital Network-Basic User-Network Interface—Layer 1 Specification. Cited by other, Nov. 1995.
Office Action: BINDER 22B dated Nov. 27, 2009.
Office Action-Final Rejection: BINDER 22B dated Jul. 22, 2010.
Office Action dated Jul. 22, 2010: U.S. Appl. No. 12/016,324; 101 pages.

ADDRESSABLE OUTLET, AND A NETWORK USING THE SAME

CROSS-REFERENCE TO RELATED APPLICATION

This application is a continuation of U.S. application Ser. No. 10/491,989, filed on Apr. 7, 2004, the disclosure of which is incorporated herein by reference.

FIELD OF THE INVENTION

The present invention relates to the field of wired Local Area Networks (LAN's) using outlets, and, more specifically, to an addressable outlet for use in such networks.

BACKGROUND OF THE INVENTION

Outlets

The term "outlet" herein denotes an electro-mechanical device, which facilitates easy, rapid connection and disconnection of external devices to and from wiring installed within a building. An outlet commonly has a fixed connection to the wiring, and permits the easy connection of external devices as desired, commonly by means of an integrated connector in a faceplate. The outlet is normally mechanically attached to, or mounted in, a wall. Non-limiting examples of common outlets include: telephone outlets for connecting telephones and related devices; CATV outlets for connecting television sets, VCR's, and the like; and electrical outlets for connecting power to electrical appliances. The term "wall" herein denotes any interior or exterior surface of a building, including, but not limited to, ceilings and floors, in addition to vertical walls.

LAN Environment

FIG. 1 shows a typical prior art LAN environment 10. Such a network commonly uses 10BaseT or 100BaseTX Ethernet IEEE802.3 interfaces and topology, and features a hub 11 as a concentrating device, into which all devices are connected. Devices are connected to the hub 11 by data connectors 14a, 14b, and 14c, which are housed within network outlets 15a, 15b, and 15c respectively. Connections to the hub 11 are via cables 13a, 13b, and 13c respectively. Data connectors 14a, 14b, and 14c may be, for example, type RJ-45 connectors; and cables 13a, 13b, and 13c may be, for example, Category 5 cabling. The data portion of network 10 uses data units (which may be computers) 7a, 7b, and 7c, which connect to network connectors 14a, 14b, and 14c via cables 16a, 16b, and 16c, respectively. A server 12 may also be connected to the hub 11, and can perform the external connection functionality, as well as other server functions as applied in the art.

Although FIG. 1 refers to the hub 11 as a concentrating device, it is to be understood that any type of device having multiple network interfaces and supporting a suitable connectivity can be used, non-limiting examples of which include shared hubs, switches (switched hubs), routers, and gateways. Hence, the term "hub" herein denotes any such device without limitation. Furthermore, network 10 can be any packet-based network, either in-building or distributed, such as a LAN or the Internet.

The topology of network 10 as shown in FIG. 1 incurs various maintenance difficulties. The wiring from the hub 11 to the data unit 7a, for example, includes wire 13a, connector 14a and wire 16a. Because these conductors are continuous, there is no easy way to distinguish a break or short-circuit in wire 13a from a break or short-circuit in wire 16a, nor from a break or short-circuit in connector 14a.

Troubleshooting such failures requires disconnecting cables and inserting dedicated test equipment or making elaborate and thorough substitutions of components that are known to be functional. Such procedures are complicated, labor-intensive, time-consuming, and expensive. Furthermore, in the common case of an outlet to which no data unit is connected, there is no simple way to test the continuity of wiring from the hub to the outlet. In addition, in many cases it is necessary to test the LAN from a remote place (such as via the Internet) in cases where it is not possible to attach testing equipment to non-connected outlets.

Discussion of network management and example of network management system are part of U.S. Pat. No. 5,812,750 to Dev et al.

Home Networking

Most existing offices and some of the newly built buildings facilitate the network structure of network 10. However, implementing such a network in existing buildings typically requires installation of new wiring infrastructure. Such installation of new wiring may be impractical, expensive and hassle-oriented. As a result, many technologies (referred to as "no new wires" technologies) have been proposed in order to facilitate a LAN in a building without adding new wiring. Some of these techniques use existing wiring used also for other purposes such as telephone, electricity, cable television, and so forth. Doing so offers the advantage of being able to install such systems and networks without the additional and often substantial cost of installing separate wiring within the building. In order to facilitate multiple use of wiring within a building, specialized outlets are sometimes installed, which allow access to the wiring for multiple purposes. An example of home networking over coaxial cables using outlets is described in WO 02/065229 published 22 Aug. 2002 entitled: 'Cableran Networking over Coaxial Cables' to Cohen et al.

The use of such wiring for additional purposes creates a need for ways of easily determining the condition of the wiring and obtaining this information remotely.

Home networking using existing telephone lines will be described as an example.

DEFINITIONS AND BACKGROUND

The term "telephony" herein denotes in general any kind of telephone service, including analog and digital service, such as Integrated Services Digital Network (ISDN).

Analog telephony, popularly known as "Plain Old Telephone Service" ("POTS") has been in existence for over 100 years, and is well-designed and well-engineered for the transmission and switching of voice signals in the 3-4 KHz portion (or "band") of the audio spectrum. The familiar POTS network supports real-time, low-latency, high-reliability, moderate-fidelity voice telephony, and is capable of establishing a session between two end-points, each using an analog telephone set.

The terms "telephone", "telephone set", and "telephone device" herein denote any apparatus, without limitation, which can connect to a Public Switch Telephone Network ("PSTN"), including apparatus for both analog and digital telephony, non-limiting examples of which are analog telephones, digital telephones, facsimile ("fax") machines, automatic telephone answering machines, voice modems, and data modems.

The terms "data unit", "computer" and "personal computer" ("PC") as used herein include workstations and other data terminal equipment (DTE) with interfaces for connection to a local area network In-home telephone service usually employs two or four wires, to which telephone sets are connected via telephone outlets.

Home Networking Over Telephone Lines.

FIG. 2 shows the wiring configuration of a prior-art telephone system including a network 20 for a residence or other building, wired with a telephone line 5, which has a single wire pair that connects to a junction-box 34, which in turn connects to a Public Switched Telephone Network (PSTN) 39 via a cable 33 ('local loop'), terminating in a public switch 32, which establishes and enables telephony from one telephone to another. The term "high-frequency" herein denotes any frequency substantially above such analog telephony audio frequencies, such as that used for data. ISDN typically uses frequencies not exceeding 100 KHz (typically the energy is concentrated around 40 KHz). The term "telephone line" herein denotes electrically-conducting lines which are intended primarily for the carrying and distribution of analog telephony signals, and includes, but is not limited to, such electrically-conducting lines which may be pre-existing within a building and which may currently provide analog telephony service.

Junction box 34 separates the in-home circuitry from the PSTN and is used as a test facility for troubleshooting as well as for new wiring in the home. A plurality of telephones may connect to telephone lines 5 via a plurality of telephone outlets. Each outlet has a connector (often referred to as a "jack"), commonly being in the form of RJ-11 connectors in North-America. Each outlet may be connected to a telephone unit via a compatible "plug" connector that inserts into the jack.

Wiring 5 is usually based on a serial or "daisy-chained" topology, wherein the wiring is connected from one outlet to the next in a linear manner; but other topologies such as star, tree, or any arbitrary topology may also be used. Regardless of the topology, however, the telephone wiring system within a residence always uses wired media: two or four copper wires terminating in one or more outlets which provide direct access to these wires for connecting to telephone sets.

It is often desirable to use existing telephone wiring simultaneously for both telephony and data networking. In this way, establishing a new local area network in a home or other building is simplified, because there is no need to install additional wiring.

The concept of frequency domain/division multiplexing (FDM) is well-known in the art, and provides means of splitting the bandwidth carried by a wire into a low-frequency band capable of carrying an analog telephony signal and a high-frequency band capable of carrying data communication or other signals. Such a mechanism is described, for example, in U.S. Pat. No. 4,785,448 to Reichert et al. (hereinafter referred to as "Reichert"). Also widely used are xDSL systems, primarily Asymmetric Digital Subscriber Loop (ADSL) systems.

Examples of relevant prior-art in this field are the technology commonly known as HomePNA (Home Phoneline Networking Alliance), WO 99/12330 to Foley and as disclosed in U.S. Pat. No. 5,896,443 to Dichter (hereinafter referred to as "Dichter"). Dichter and others suggest a method and apparatus for applying a frequency domain/division multiplexing (FDM) technique for residential telephone wiring, enabling the simultaneous carrying of telephony and data communication signals. The available bandwidth over the wiring is split into a low-frequency band capable of carrying an analog telephony signal, and a high-frequency band capable of carrying data communication signals. In such a mechanism, telephony is not affected, while a data communication capability is provided over existing telephone wiring within a home.

In addition to illustrating a residential telephone system, FIG. 2 also shows the arrangement of a Dichter network. Network 20 serves both analog telephones and provides a local area network of data units. Data Terminal Equipment (DTE) units 7a, 7b, 7c and 7d are connected to the local area network via Data Communication Equipment (DCE) units 25a, 25b, 25c and 25d, respectively. Examples of Data Communication Equipment include, but are not limited to, modems, line drivers, line receivers, and transceivers (the term "transceiver" herein denotes a combined transmitter and receiver), which enables data communication over the high spectrum of telephone line 5. DCE units ('phoneline modems') 25a, 25b, 25c and 25d are respectively connected to high pass filters (HPF) 24a, 24b, 24c and 24d, which allow access to the high-frequency band carried by telephone line 5. In order to avoid interference to the data network caused by the telephones, low pass filters (LPF's) 23a, 23b, 23c and 23d are added to isolate the POTS carrying band, so that telephones 26a, 26b, 26c and 26d connects to telephone line 5 for providing PSTN. Furthermore, a low pass filter may also be connected to Junction Box 34 (not shown in the figure), in order to filter noise induced from or input to PSTN wiring 33.

WO 01/71980 published Sep. 27, 2001 entitled "*Telephone Outlet and System for a Local Area Network Over Telephone Lines*" in the name of the present inventor and assigned to the present assignee, describes the integration of DCE 25, HPF 24, and LPF 23 components into outlets 21 in order to reduce complexity, as shown in FIG. 2. This allows direct connection of telephone sets 6a, 6b, 6c, and 6d to outlets 21a, 21b, 21c, and 21d, respectively, via dedicated connectors (as is done in prior-art common telephone outlets), as well as direct and easy connection of data units 7a, 7b, 7c, and 7d to the respective outlets via dedicated jacks, as is usually done in LAN systems (as shown in FIG. 1).

The topology of network 20 as shown in FIG. 2 exhibits the maintenance difficulties previously discussed. The data flow from data unit 7a to data unit 7b, for example, is via wiring 16a, wiring 5b and wiring 16b, as well as connectors such as 22a and 22b. Having continuous data flow, there is no easy way to distinguish a short-circuit in wiring 16a from a short-circuit in wiring 16b, or from a short-circuit in wiring 5b, or from a short-circuit in any of the interim connectors. Similarly, a break in the wiring cannot be easily or remotely isolated to wiring 16a or wiring 16b. Troubleshooting any of the above failures can only be accomplished by trial and error and requires disconnecting cables 16a, 16b, 16c, and 16d, and inserting other data units to the outlets. If the failure, however, is in wiring 5c, more troubleshooting will be necessary, and can ultimately involve disconnecting the entire network. As noted above, this is a complicated, expensive, labor-intensive, and time-consuming effort. Furthermore, in the common case of an outlet into which no data units are connected, there is no simple way to test wiring continuity to the outlet. In addition, as explained in WO 99/03255 to Bell, in many cases it is required to test the LAN from a remote place (e.g. via the Internet), and no local presence is available to approach the disconnected outlets for attaching testers.

U.S. Pat. No. 4,787,082 entitled Data flow control arrangement for local area network (Delaney eL al.) published Nov. 22, 1988 discloses a local data distribution network wherein a plurality of bi-directional data distribution busses are each connected to a bus master control circuit at a terminal end of the bus. Connected to each of the data distribution busses are a plurality of passive outlets to which intelligent connectors or stations may be connected. Each station has a unique address and is utilized for individually coupling data processing devices to the bus. A bus termination hub switching facility cooperates with the included group of bus master control circuits to interconnect data processing stations on the various busses. The bus termination hub facility includes bus monitoring, status polling and maintenance facilities. A faulty bus is disconnected if a fault is discovered during monitoring intervals. It remains disconnected until the fault is corrected.

JP 55132197A2 published Oct. 14, 1980 in the name of Sharp Corporation and entitled "*Unit Controlling Electric Equipment Making Use of House Wiring*" relates to the control of electrical equipment connected to house wiring. An address information signal is sent through a coupling unit from a transmission controller to house wiring. On the reception side, reception controllers receive the address information signal through coupling units inserted into sockets provided at respective positions of the house wiring. From one of controllers whose incorporated address information agrees with the received address information, answer information is sent back to the transmission side. On the transmission side, an operation command code is sent out upon receiving the answer information from the reception side so as to control electric equipment.

In both above prior art patents, passive outlets are used, hence there is no way to distinguish between a failure in the wiring into which the outlets are connected, and a failure in the wiring/equipment connected to the outlet.

There is thus a widely recognized need for, and it would be highly advantageous to have, a method and system for allowing remote diagnosis of LAN environment outlets without requiring local access to the network and without dismantling the network. This goal is met by the present invention.

SUMMARY OF THE INVENTION

It is an object of the present invention to allow convenient determination of the status of installed wiring within a building, and the outlets and connectors thereto.

It is a further object of the present invention to allow convenient determination of the condition of devices and apparatus connected to the various outlets of an installed wiring system. It is moreover an object of the present invention to permit such determination remotely.

In order to attain these objectives, the present invention provides an outlet having an address which uniquely identifies the outlet within an information network that is established, at least in part, over wiring to which the outlet is connected. Associated with this unique network address is processing circuitry and an addressing unit capable of storing and utilizing the unique network address, to allow the outlet to receive and send messages associated with the address. The processing circuitry interfaces with the network to support such messaging, and may generate content for messages to be sent to other devices on the network, and may likewise receive and process messages sent to the outlet from other devices. The unique network address is associated with both the sending and receiving of messages over the network. In the case of receiving messages, the unique address allows the circuitry in the outlet to discriminate between messages intended for that outlet and messages intended for other devices. In the case of sending messages, the unique address serves to identify the source of the message. Because addresses are associated both with senders and receivers, the processing circuitry may respond to messages sent to the outlet from other devices by sending messages from the outlet to other devices.

Outlets according to the present invention include, but are not limited to, electrical power outlets, telephone outlets, and cable television outlets.

The term "information network" herein denotes any system that allows multiple devices to send and receive information of any kind, wherein each device may be uniquely identified for purposes of sending and receiving information. Information networks include, but are not limited to, data networks, control networks, cable networks, and telephone networks. A data network utilizing outlets according to the present invention can be a local area network (LAN) or part of a wide-area network, including the Internet.

Therefore, according to the present invention there is provided an outlet for use with wiring installed in a building, and having at least one address that uniquely identifies the outlet within an information network.

BRIEF DESCRIPTION OF THE DRAWINGS

The invention is herein described, by way of non-limiting example only, with reference to the accompanying drawings, wherein.

DESCRIPTION OF THE INVENTION

Figure 1:
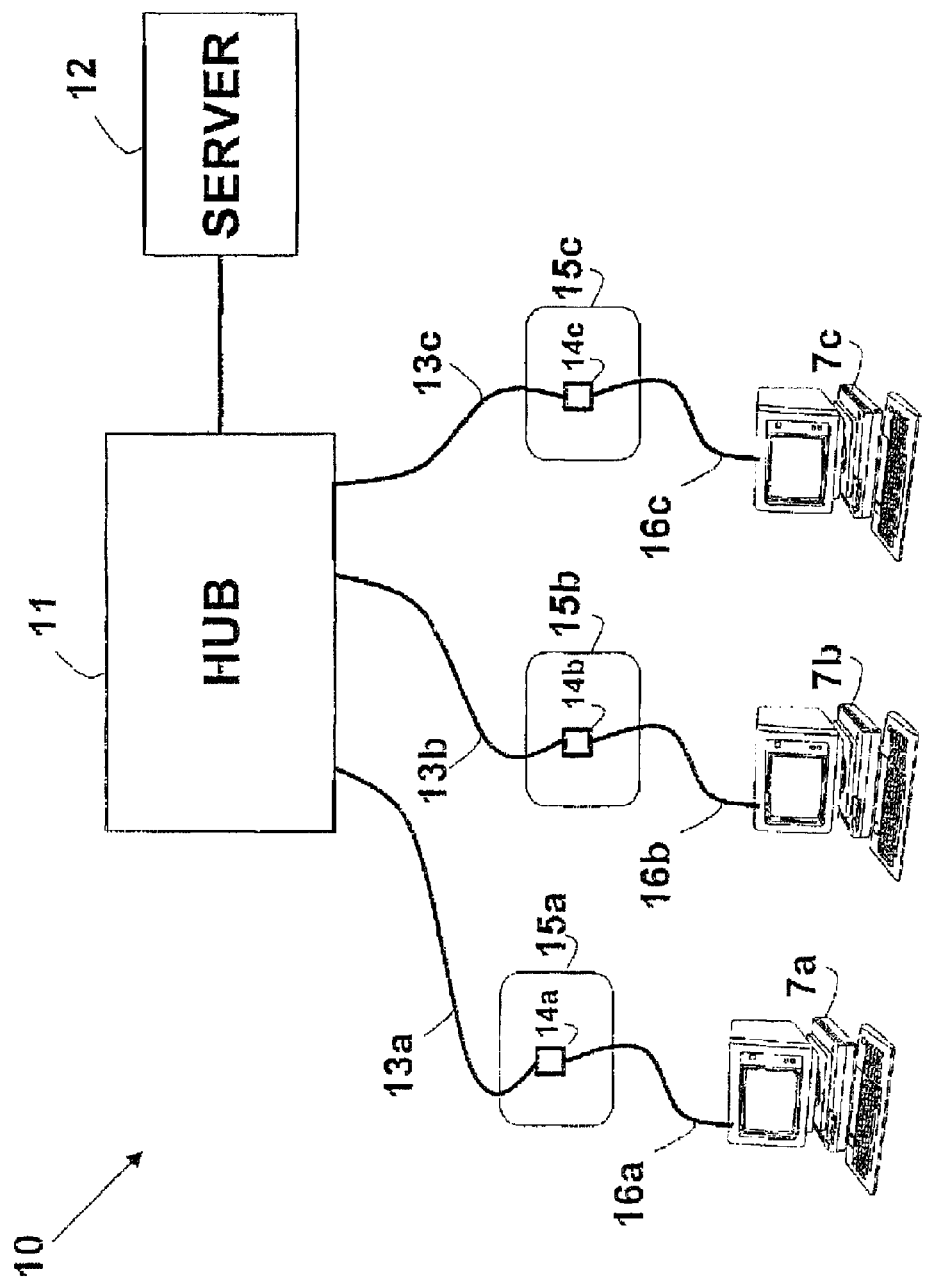
FIG. 1 shows a prior art local area network.
Figure 2:
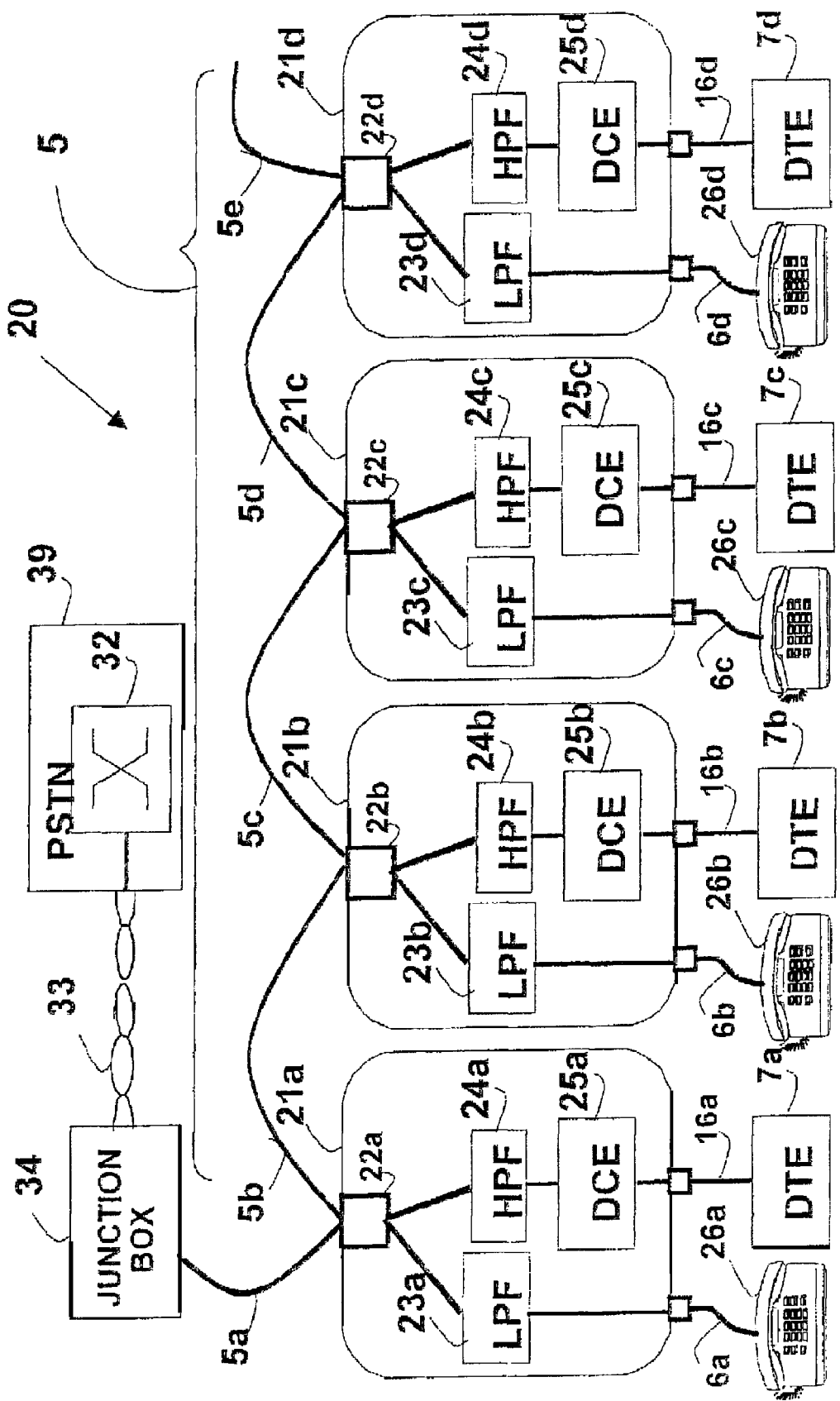
FIG. 2 shows a prior art local area network over telephone lines.

The principles and operation of a network according to the present invention may be understood with reference to the drawings and the accompanying description. The drawings and descriptions are conceptual only. In actual practice, a single component can implement one or more functions; alternatively, each function can be implemented by a plurality of components and circuits. In the drawings and descriptions, identical reference numerals indicate those components that are common to different embodiments or configurations.

Figure 3:
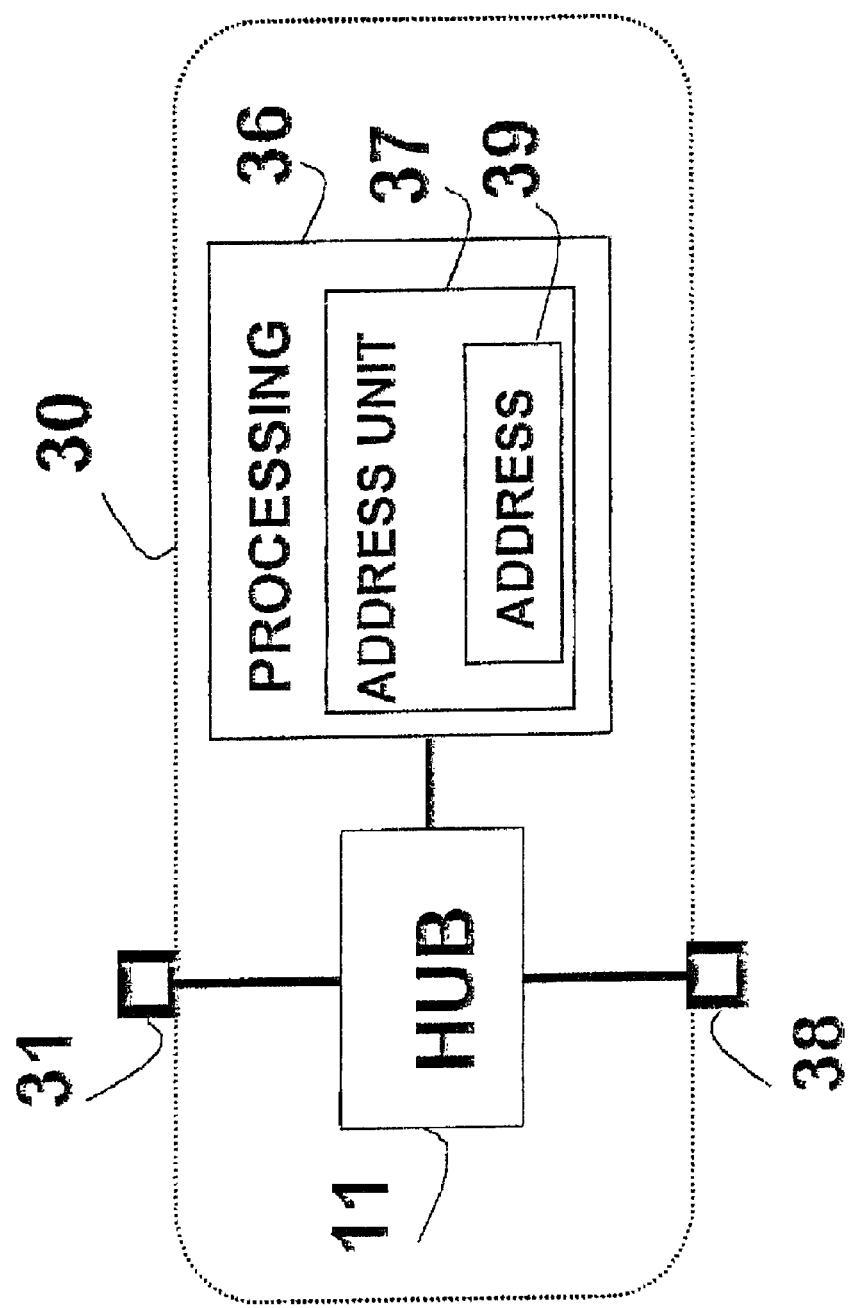
FIG. 3 shows a local area network outlet according to the present invention.

FIG. 3 schematically shows an outlet 30 according to a first embodiment of the invention. As shown in FIG. 3, outlet 30 includes a three-port hub 11. One port goes to a connector 31, which connects the outlet 30 to network wiring as previously described, and as is known in the art (such as to wiring 13*a* in FIG. 1). Another hub port goes to a connector 38, enabling connection of a data unit as described previously and as is known in the art (such as to data unit 7*a* via wiring 16*a* in FIG. 1). The third port goes to a processing unit 36, integrated within outlet 30. Processing unit 36 provides the basic functionality of a data unit (such as data unit 7*a* of FIG. 1), and principally includes an address unit 37, with a stored address 39, that is unique within the network. For example, in an Ethernet network using interfaces 10BaseT or 100BaseTX according to IEEE802.3, the processing unit 36 may include a MAC (Media Access Control) address or an IP (Internet Protocol) address, as the address 39. In this manner, outlet 30 becomes an addressable entity within the network, and is able to respond to messages carrying address 39, or to transmit messages containing address 39 as a source. Because the outlet 30 is an addressable entity in the network, it is possible to execute remote diagnostics to determine the status and health of the outlet 30. For example, a message calling for a reply can be sent to the outlet 30. Receiving an answer from such an outlet confirms the existence of the outlet in the network, as well as the basic functionality of the outlet and any connections to the outlet via which the answer is received. Furthermore, one or more status devices may be integrated in the outlet and addressed either individually or as a group, to providing meaningful data about the outlet status and the condition of the network in general. Typical status devices are voltage sensors, continuity detectors, hub activity indicators, transducers etc. Network condition includes, but is not limited to, such factors as continuity of wiring, connector status, connected devices, topology, signal delays, latencies, and routing patterns. Although the outlet 30 has been described above as having a single data networking interface 38, multiple interfaces can be supported, each connected to a different port of hub 11. Processing unit 36 may also be capable of analyzing received messages, in order to perform actions in response thereto, as well as composing messages for sending, in order to respond to received messages, or to initiate messages to other devices on the network. For example, processing unit 36 may detect an abnormal condition or emergency situation, and may therefore notify other devices on the network via messages.

Managed devices such as managed hub, managed switch and router are known in the art. Outlet 30 may be viewed as a managed device housed within an outlet.

Figure 4:
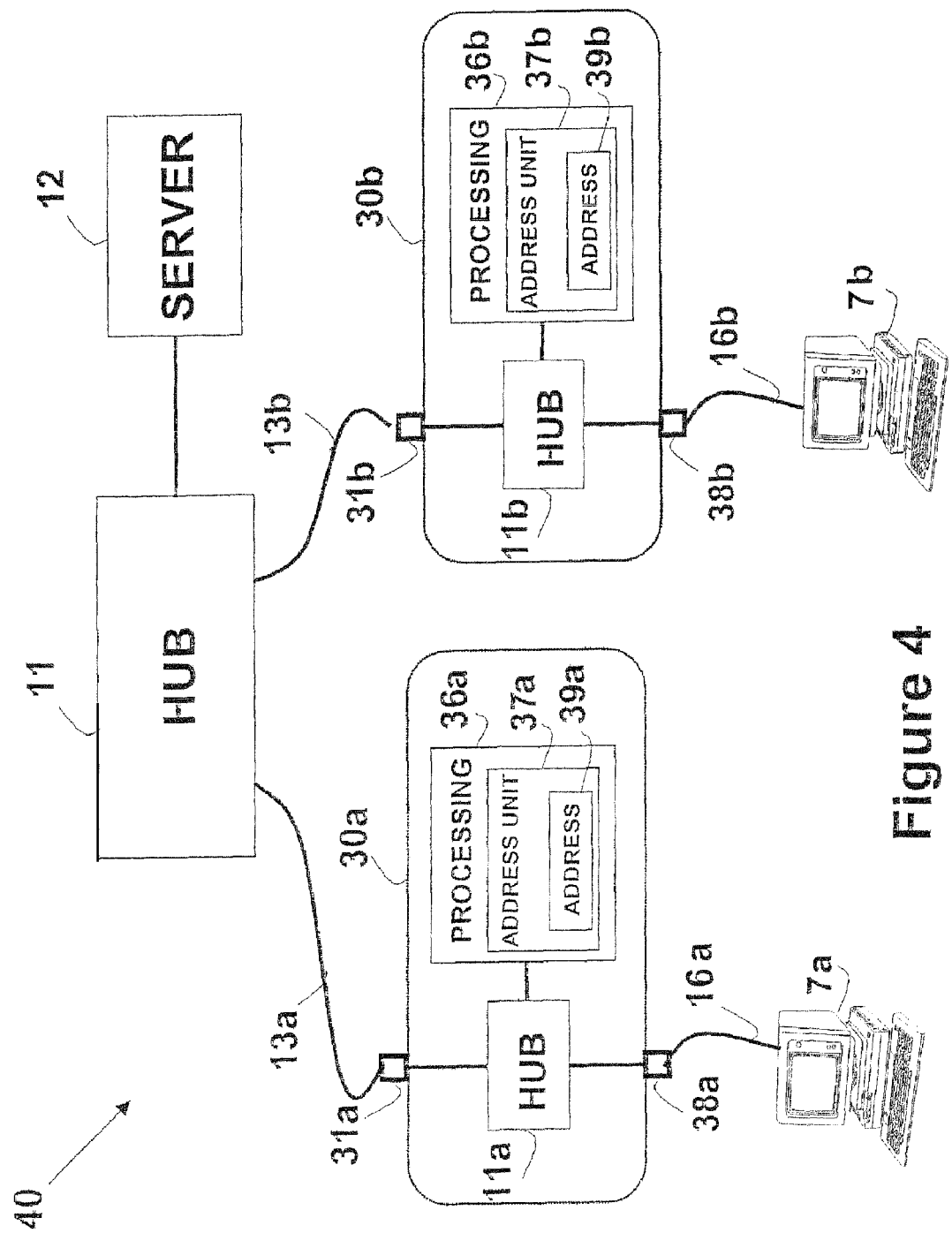
FIG. 4 shows a local area network according to the present invention.

FIG. 4 shows a Local Area Network (LAN) 40 according to the present invention. Basically, the infrastructure of network 40 is the same as that of prior art network 10 (FIG. 1), in which hub 11 is connected in a 'star' topology to various end units via network wiring 13*a* and 13*b*, which are connected respectively to outlets 15*a* and 15*b* (in FIG. 1). However, according to the present invention, outlets 15*a* and 15*b* of prior-art network 10 are replaced by outlets 30*a* and 30*b*, respectively, which contain addressable processing units 36*a* and 36*b*, as previously described with reference to FIG. 3. For example, outlet 30*a* has built-in processing unit 36*a*, addressing unit 37*a*, and address 39*a*. Outlet 30*a* allows for connection of data unit 7*a* via a connector 38*a* using wiring 16*a*. Similarly, outlet 30*b* allows data unit 7*b* to be connected to the network via wiring 16*b* to a connector 38*b*. Addressing units 37*a* and 37*b* integrated within outlets 30*a* and 30*b*, respectively, allow for unique identification of outlets 30*a* and 30*b* by addresses 39*a* and 39*b*, respectively. Network 40 offers the advantages of being able to individually address each outlet, hence allowing remote diagnostics. The outlets 30*a* and 30*b* of network 40 can now facilitate fault localization. For example, the server 12 will transmit a message to outlet 30*a*, using outlet 30*a* address, followed by a message to data unit 7*a*. In the case wherein outlet 30*a* responds to the server 12 and data unit 7*a* does not respond, the most probable scenario is that the connection between the data unit and outlet 30*a* is faulty or no data unit is connected to outlet 30*a*. Hence, assuming data unit 7*a* is connected, the fault is easily limited only to connector 38*a*, wiring 16*a* or data unit 7*a*. Similarly, in the case wherein no reply is received from outlet 30*a*, the fault is localized to cable 13*a*, connector 31*a* or outlet 30*a*.

Powering the outlet 30 can be implemented either locally, by connecting a power supply to each outlet, or, preferably, via the network itself. In the latter case, commonly known as "Power over LAN", the power can be carried to the outlet from a central location either by an additional wire pair, using the well-known phantom configuration, or by the FDM (Frequency Division/Domain Multiplexing) method. The latter commonly employs DC feeding, which is frequency-isolated from the data carried in the higher part of the spectrum.

Figure 5:
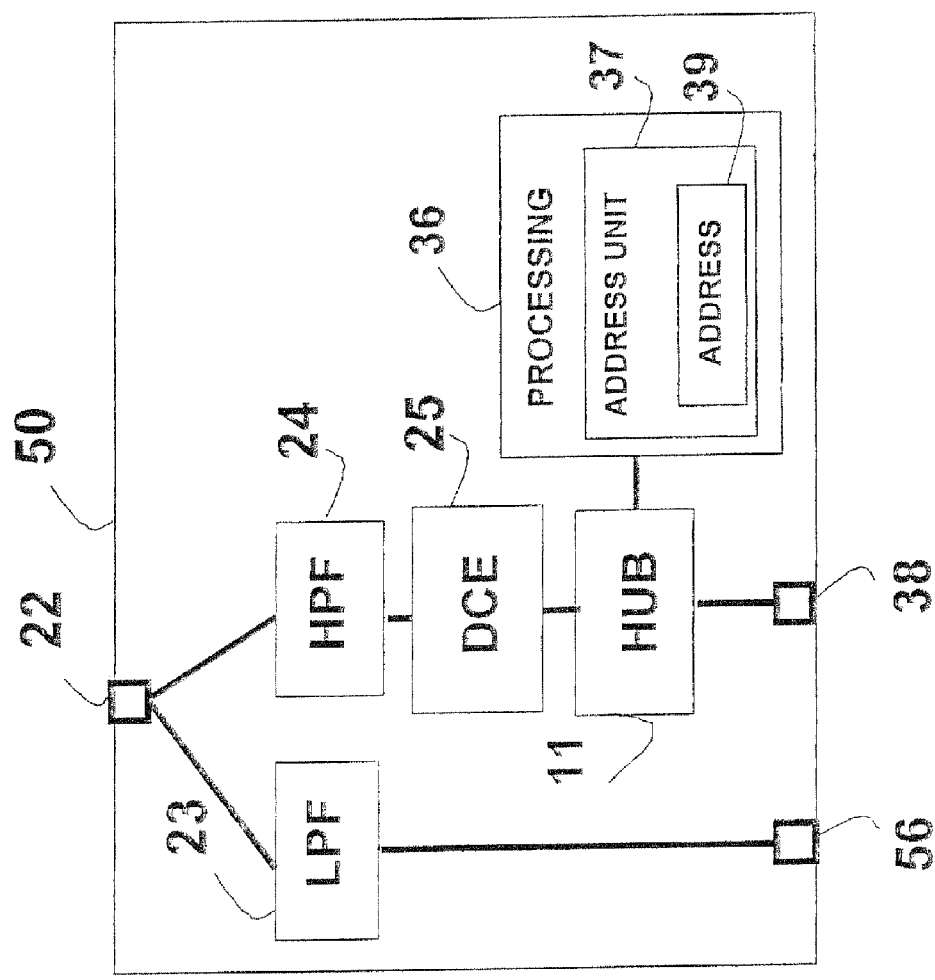
FIG. 5 shows a local area network over telephone lines outlet according to the present invention.

In another embodiment, the present invention is used in a data network over in-building telephone lines, where analog telephony signals are carried in the low-frequency portion of the spectrum, and data communication signals are carried in the high-frequency portion. FIG. 5 shows an outlet 50 according the present invention, which is able to separate and combine signals in different portions of the spectrum. Outlet 50 connects to the telephone wiring via a connector 22, preferably located at the rear part of outlet 50, where outlet 50 mechanically mounts to an interior wall of the building. A Low Pass Filter (LPF) 23 isolates the analog telephony part of the spectrum for connection to an analog telephone via a jack 56. Jack 56 is preferably a standard telephone jack, such as RJ-11 in North-America. Data communication signals are isolated by a High Pass Filter (HPF) 24, which connects to a Data Communications Equipment (DCE) unit 25, which serves as a modem for data communications over the telephone line media. An integrated hub 11 allows sharing data between processing unit 36, including address unit 37 with address 39, and a data jack 38, for connecting external devices to the network via DCE unit 25. Processing unit 36 with integrated address unit 37 allows messages directed to or from the outlet to be uniquely routed. Outlet 50 supports both standard analog telephony (via jack 56) as well as data communications via jack 38.

Figure 6:
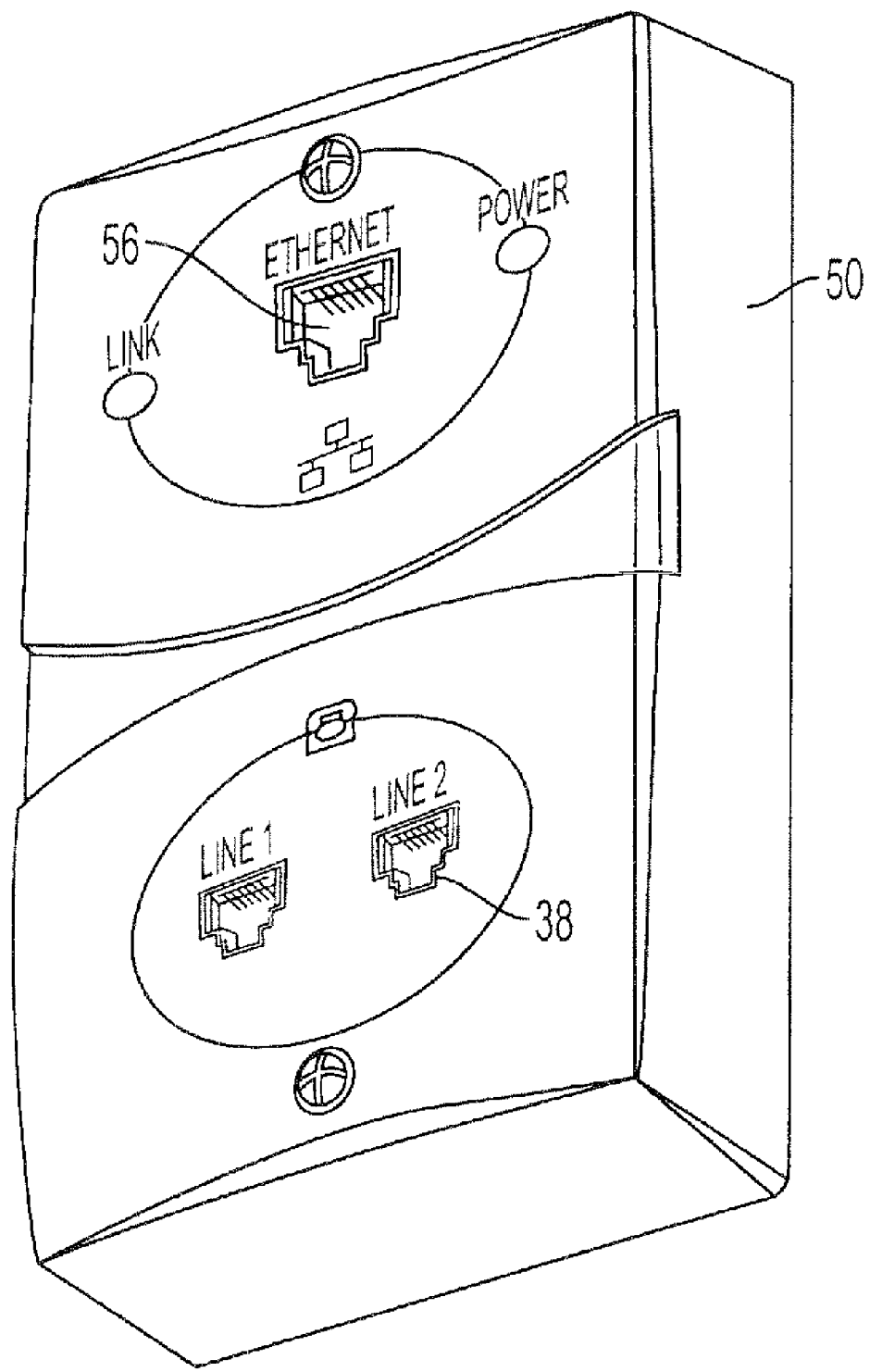
FIG. 6 illustrates the front panel of a telephone outlet according to the present invention.

FIG. 6 pictorially illustrates the front panel of a telephone outlet 50 according to the present invention, having both telephony connector 56 and data connector 38.

Figure 7:
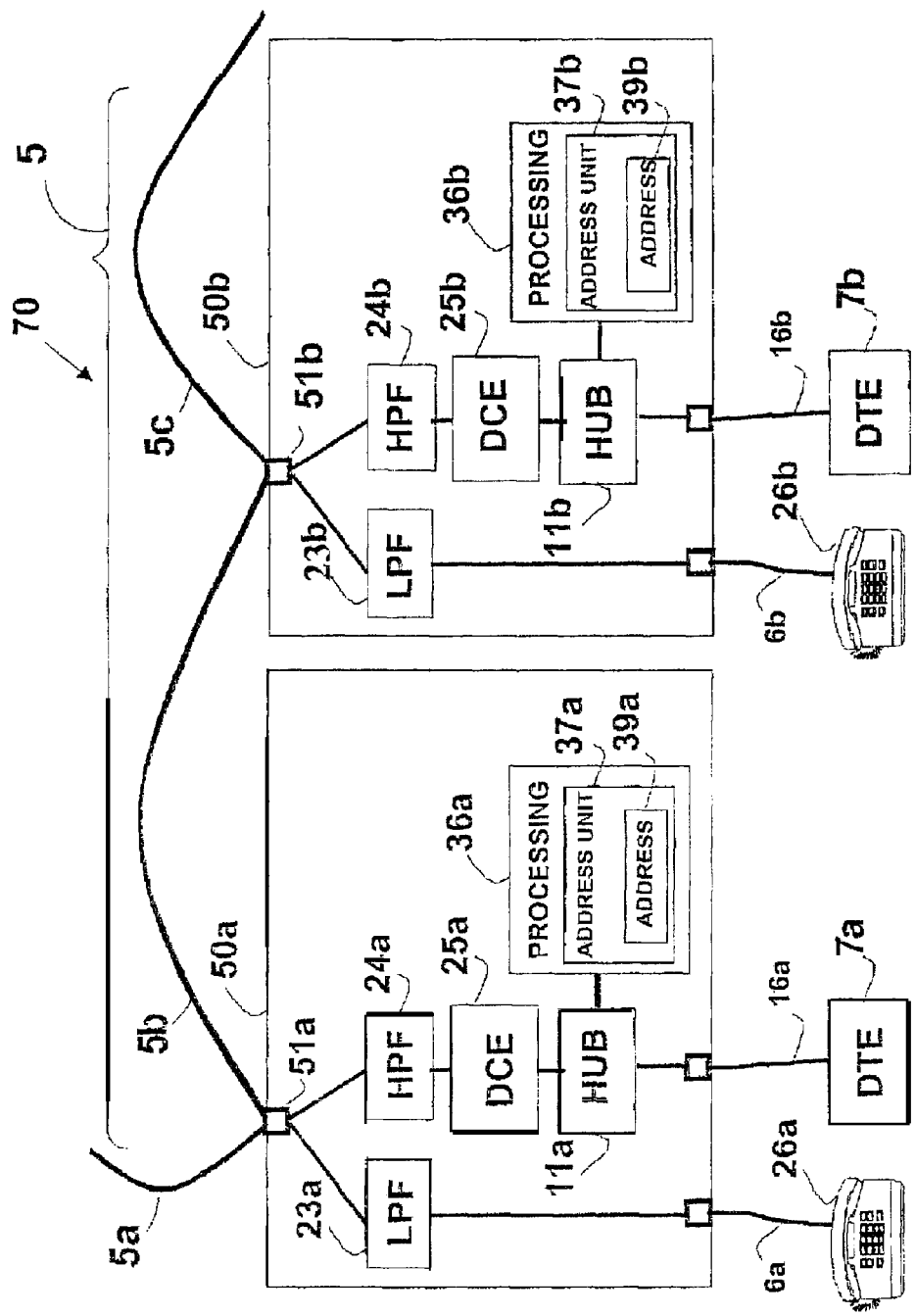
FIG. 7 shows a local area network over telephone lines according to the present invention.

FIG. 7 illustrates a network 70 that operates over telephone lines 5*a*, 5*b*, and 5*c*, and employs outlets 50*a* and 50*b* according to the present invention. Network 70 supports regular PSTN telephony service via analog telephone sets 26*a* and 26*b*, connected to the telephone connectors of outlets 50*a* and 50*b* respectively. Simultaneously, data networking can be accomplished by data units 7*a* and 7*b*. Outlets 50*a* and 50*b* can each be addressed by any other outlet or data unit in the network using dedicated addresses 39*a* and 39*b*, conveyed by address units 37*a* and 37*b*, respectively. Similarly, outlets 50*a* and 50*b* can address any other entity in the network, and as such both the outlets and the various network segments can be fault isolated as described above.

Figure 8:
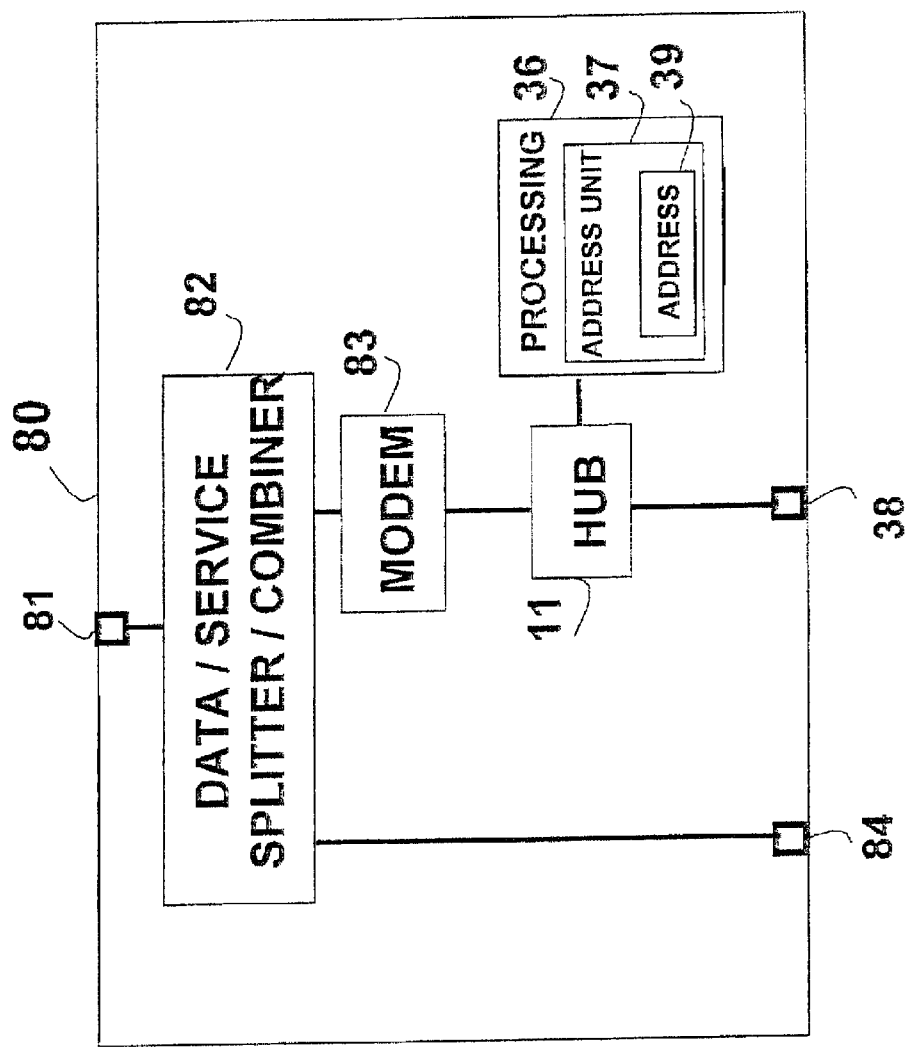
FIG. 8 illustrates a general form of an outlet according to the present invention, which can serve in various wired network environments, such as CATV and electrical power networks.

Although the invention has been so far demonstrated as relating to telephone wiring and telephone outlets, the invention can be similarly applied to any type of wired networking within a building, such as CATV or electrical power wiring. FIG. 8 illustrates an outlet 80, which is a general embodiment of the present invention. Outlet 80 is similar in overall layout to the outlet 50 shown in FIG. 5. Outlet 80 connects to the relevant wiring via a connector 81 and contains an integrated data/service splitter/combiner unit 82, which isolates the data carried over the wiring from the main service signal. In the case of telephony, unit 82 contains a low-pass filter (such as LPF 23*a* as shown in FIG. 7) and a high-pass filter (such as HPF 24*a* as shown in FIG. 7). In the case of electrical power wiring, the AC power is split by unit 82 and fed to a socket 84, for supplying electrical power as is normal for such an outlet. In this case, a modem 83 being a power-line carrier (PLC) modem interfaces the hub 11 to the integrated data/service splitter/combiner unit 82 to allow data communication over the power line. Similarly, in the case of a CATV application, where the CATV wiring is used for the network infrastructure, modem 83 is a coaxial cable modem, and unit 82 isolates the CATV signal from the data signal.

Although the invention has been so far described as relating to Ethernet/IP-based data networks, the invention can be similarly applied to any type of data network. Furthermore, although packet networks are the most common for local area networks, the invention is not restricted to packet networks only, and can be applied to any digital data network, where network entities are identified uniquely by addresses.

Furthermore, although the invention has been described as relating to networks based on continuous electrical conducting media (telephone, CATV, or electrical power), and the relevant modem and associated circuitry are connected in parallel to the wiring infrastructure, the invention can be applied equally to the case wherein the wiring is not continuous, but is in discrete segments. Such an arrangement is disclosed in WO 0007322 published Feb. 10, 2000 and entitled "*Local Area Network of Serial Intelligent Cells*" in the name of the present inventor and assigned to the present assignee.

Although outlets 30, 50 and 80 are each described above as having a single data connection, it is to be understood that multiple data network interfaces can be included within an outlet, each connected to different port of the respective hub (such as hub 11*a*, as shown in FIG. 7).

In addition, although the present invention has been described with respect to a single address associated with each outlet, it will be appreciated that multiple addresses can also be assigned to an outlet. Different addresses can be associated with different data ports and/or with different functionalities of the outlet thus improving fault isolation by separately addressing the addressable data ports or functionalities until an absence of a response signal to a diagnostic message indicates that the addressed port and/or functionality of the outlet is faulty or that there is a break in the connection path thereto.

Figure 9:
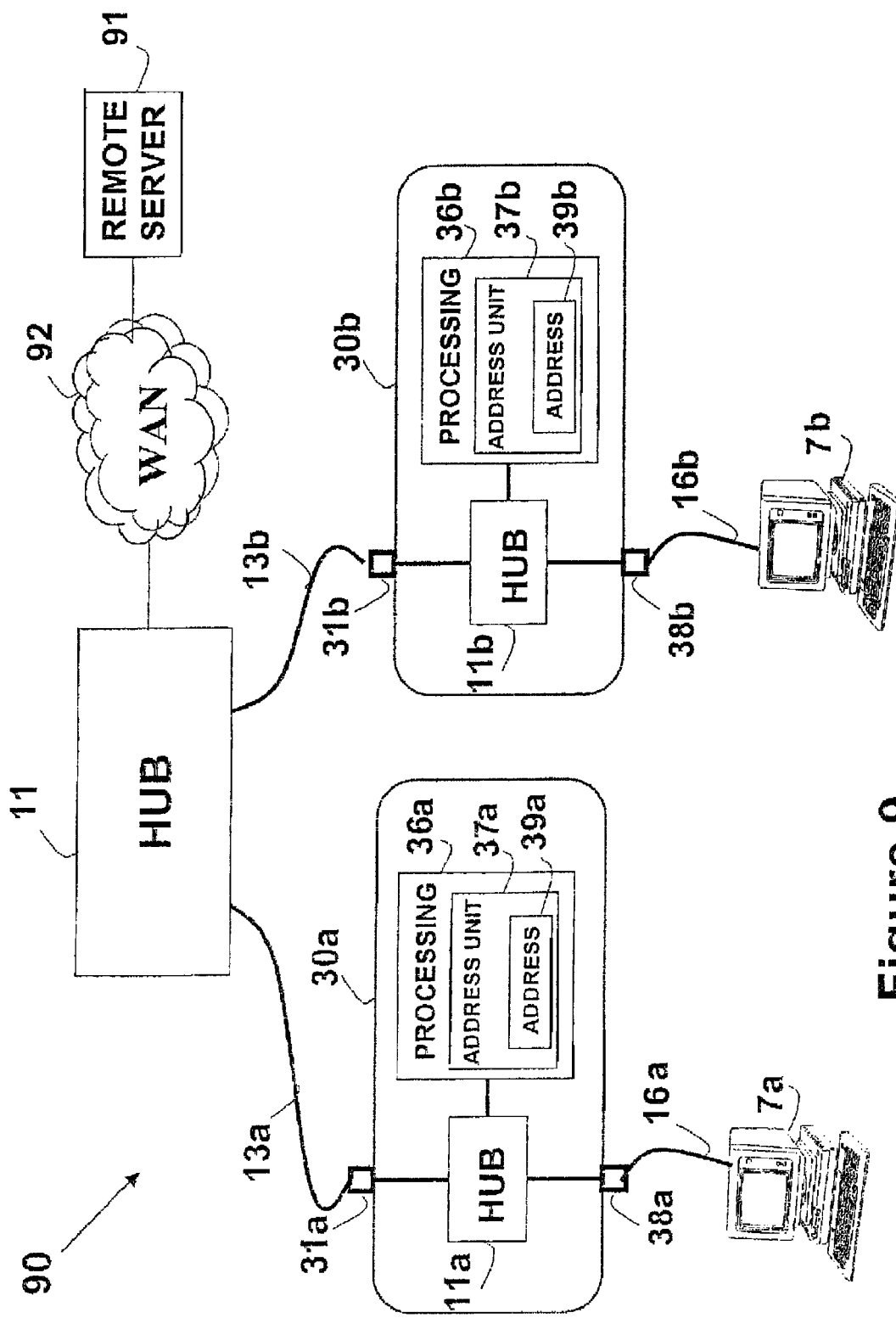
FIG. 9 shows a remote-managed local area network according to the present invention.

While the invention has been described with regard to local area networks, wherein the fault is localized locally, it will be appreciated that assigning addresses to outlets facilitates also remote diagnostics and fault localization. Such a network 90 is described in FIG. 9. Network 90 comprises local area network part similar to network 40 above (Phoneline, CATV or powerline based networks can equally be used). However, an external connection is added to an external network 92. The connection makes use of a gateway 93, bridging between the external WAN and the internal LAN, commonly known as Integrated Access Device (IAD), Home or Residential Gateway (RG). For example, the external network can be a Wide Area Network (WAN), either wired or non-wired. For example, the external network 92 can be the Internet. The connection can be via different access technologies such as xDSL (using xDSL modem), CATV based (using Cable Modem or Set Top Box) or wireless (satellite or terrestrial). A remote server 91 is a data unit connected remotely to the WAN 92, and hence can communicate with the local area network and its components, data units 7*a*, 7*b* and outlets 30*a* and 30*b*. In such an arrangement, fault isolation can be performed remotely, managed by the server 91. By communicating with the outlets 30*a* and 30*b* and the data units 7*a* and 7*b*, the server 91 can determine the fault localization to a segment level as described above. Furthermore, the remote server 91 may check the system integrity up to the outlets level, even if no data units are connected or operative. In such a case, a Telco (through xDSL connection) or CATV provider (through Cable modem or set-top-box) can remotely test and verify the status of the network within a home.

What is claimed is:

1. A device for coupling data units to the Internet over a coaxial cable, the coaxial cable being connected for carrying a digital data signal in a digital data frequency band that is distinct from a CATV video frequency band, said device comprising:
   a coaxial connector for connecting to the coaxial cable;
   a coaxial cable modem for transmitting and receiving digital data over the coaxial cable;
   a first filter coupled between said coaxial connector and said coaxial cable modem for substantially passing only signals in the digital data frequency band;
   a first data port for coupling to a first data unit;
   a first transceiver coupled to said first data port for bi-directional packet-based digital data communication with the first data unit;
   a second data port for coupling to a second data unit;
   a second transceiver coupled to said second data port for bi-directional packet-based digital data communication with the second data unit;
   a multiport interconnection circuit consisting of one of: a switch; a router; and a gateway, coupled to pass digital data between said coaxial cable modem and said first and second transceivers;
   a processor coupled to control and monitor said first and second transceivers and said coaxial cable modem;
   a first address unit coupled to said processor for storing a first address that uniquely identifies said device in a digital data network; and
   a single enclosure housing said coaxial connector, said coaxial cable modem, said first filter, said first and second data ports, said first and second transceivers, said multiport interconnection circuit, said processor and said first address unit.

2. The device according to claim 1, further operative for coupling a CATV video signal to a CATV unit, the coaxial cable being connected for concurrently carrying the CATV video signal in the CATV video frequency band using frequency division multiplexing, said device further comprising:
   a coaxial jack for connecting to the CATV unit to conduct the CATV video signal to the CATV unit; and
   a second filter coupled between said coaxial connector and said coaxial jack for substantially passing only signals in the CATV video frequency band between the coaxial cable and the CATV unit.

3. The device according to claim 1, wherein: the coaxial cable is connected to a CATV service provider; communication over the coaxial cable is based on cable modem standards; and said device is further operative as a cable modem or a set-top-box.

4. The device according to claim 1, wherein the first address is one of an Internet Protocol (IP) address and a Media Access Control (MAC) address.

5. The device according to claim 1, further comprising a second address unit for storing a second address.

6. The device according to claim 5, wherein each of the first and second addresses is associated with a respective distinct functionality of said device.

7. The device according to claim 1, further comprising at least one sensor selected from the group consisting of: a voltage sensor, a continuity detector, a communication activity detector; and a connected device status detector, and wherein said sensor is coupled to said processor.

8. The device according to claim 7, further operative to send messages to a remote data unit over the coaxial cable, and wherein the messages include status information associated with said sensor.

9. The device according to claim 1, further connectable to the Internet via the coaxial cable, and wherein said device is remotely manageable by a remote data unit communicating with said device through the Internet.

10. The device according to claim 1, wherein the communication with the first data unit is a Local Area Network (LAN) communication over a wired medium and wherein said first data port is a first data connector.

11. The device according to claim 10, wherein the communication with the first data unit is point-to-point bi-directional packet-based serial digital data communication.

12. The device according to claim 11, wherein the communication with the first data unit is based on IEEE802.3, 10BaseT, or 100BaseT, and said first data connector is a RJ-45 jack.

13. The device according to claim 10, wherein the communication with each of the first and second data units is point-to-point bi-directional packet-based serial digital data communication.

14. The device according to claim 1, wherein said single enclosure is constructed to have at least one of the following:
 a form substantially similar to that of a standard CATV outlet;
 wall mounting elements substantially similar to those of a standard CATV wall outlet;
 a shape allowing direct mounting in a CATV outlet receptacle or opening; and
 a form to substitute for a standard CATV outlet.

15. The device according to claim 1, wherein said device is pluggable into and attachable to a CATV outlet.

16. The device according to claim 1, wherein said single enclosure is structured to attach to a mating fixture secured on a wall.

17. The device according to claim 1, wherein said device is operative to identify and compose messages associated with the first address over a LAN coupled to said device.

18. The device according to claim 1, wherein said device is operative to identify and compose messages associated with the first address over a Wide Area Network (WAN) coupled to said device.

19. The device according to claim 1, further comprising a second address unit storing a second address, and wherein the first address is associated with said first data port and the second address is associated with said second data port.

20. The device according to claim 1, further operative for coupling a CATV video signal to a CATV unit, and wherein said device further comprises a coaxial jack coupled to said coaxial connector for conducting the CATV video signal to and from the CATV unit.

21. The device according to claim 1, wherein the coaxial cable is at least in part in walls, and said coaxial cable modem is operative to communicate with another modem of the same type in the building.

22. A wall-mounted device for coupling a data unit to the Internet over a coaxial cable, the coaxial cable being connected for carrying a digital data signal in a digital data frequency band that is distinct from a CATV video frequency band, said device comprising:
 a coaxial connector for connecting to the coaxial cable;
 a coaxial cable modem for transmitting and receiving digital data over the coaxial cable;
 a first filter coupled between said coaxial connector and said coaxial cable modem for substantially passing only signals in the digital data frequency band;
 a first data port for coupling to a first data unit;
 a first transceiver coupled between said coaxial cable modem and said first data port for bi-directional packet-based digital data communication with the first data unit;
 a processor coupled to control and monitor said first transceiver and said coaxial cable modem;
 a first address unit coupled to said processor for storing a first address that uniquely identifies said device in a digital data network; and
 a single enclosure housing said coaxial connector, said coaxial cable modem, said first filter, said first data port, said first transceiver, said processor and said first address unit,
wherein said single enclosure is mountable onto a CATV outlet opening.

23. The device according to claim 22, further operative for coupling a CATV video signal to a CATV unit, the coaxial cable being connected for concurrently carrying the CATV video signal in the CATV video frequency band using frequency division multiplexing, said device further comprising:
 a coaxial jack for connecting to the CATV unit to conduct the CATV video signal to the CATV unit; and
 a second filter coupled between said coaxial connector and said coaxial jack for substantially passing only signals in the CATV video frequency band between the coaxial cable and the CATV unit.

24. The device according to claim 22, further comprising:
 a second data port for coupling to a second data unit;
 a second transceiver coupled to said second data port for bi-directional packet-based digital data communication with the second data unit; and
 a multiport interconnection circuit consisting of one of: a switch; a router; and a gateway, coupled to pass digital data between said coaxial cable modem and said first and second transceivers.

25. The device according to claim 24, wherein the communication with each of the first and second data units is point-to-point bi-directional packet-based serial digital data communication.

26. The device according to claim 24, further comprising a second address unit for storing a second address, and wherein the first address is associated with said first data port and the second address is associated with said second data port.

27. The device according to claim 22, wherein: the coaxial cable is connected to a CATV service provider; communication over the coaxial cable is based on a CATV standard; and the device is further operative as a cable modem or a set-top-box.

28. The device according to claim 22, wherein the first address is one of an Internet Protocol (IP) address and a Media Access Control (MAC) address.

29. The device according to claim 22, further comprising a second address unit for storing a second address.

30. The device according to claim 29, wherein each of the first and second addresses is associated with a respective distinct functionality of said device.

31. The device according to claim 22, further comprising at least one sensor selected from the group consisting of: a voltage sensor, a continuity detector, a communication activity detector; and a connected device status detector, and wherein said sensor is coupled to said processor.

32. The device according to claim 31, further operative to send messages to a remote data unit over the coaxial cable, and wherein the messages include status information associated with said sensor.

33. The device according to claim 22, further connectable to the Internet via the coaxial cable, and wherein said device is remotely manageable by a remote data unit connected to said device through the Internet.

34. The device according to claim 22, wherein the communication with the first data unit is a Local Area Network (LAN) communication over a wired medium, and wherein said first data port is a first data connector.

35. The device according to claim 34, wherein the communication with the first data unit is point-to-point bi-directional packet-based serial digital data communication.

36. The device according to claim 35, wherein the communication with the first data unit is based on IEEE802.3, 10BaseT, or 100BaseT, and said first data connector is a RJ-45 jack.

37. The device according to claim 22, wherein said single enclosure is constructed to have at least one of the following:
   a form substantially similar to that of a standard CATV outlet;
   wall mounting elements substantially similar to those of a standard CATV wall outlet;
   a shape allowing direct mounting in a CATV outlet receptacle or opening; and
   a form to substitute for a standard CATV outlet.

38. The device according to claim 22, wherein said device is pluggable into and attachable to a CATV outlet.

39. The device according to claim 22, wherein said single enclosure is structured to attach to a mating fixture secured on a wall.

40. The device according to claim 22, wherein said device is operative to identify and compose messages associated with the first address over a LAN coupled to said device.

41. The device according to claim 22, wherein said device is operative to identify and compose messages associated with the first address over a Wide Area Network (WAN) coupled to said device.

42. The device according to claim 22, further operative for coupling a CATV video signal to a CATV unit, wherein said device further comprises a coaxial jack coupled to said coaxial connector for coupling a CATV video signal to the CATV unit.

43. The device according to claim 22, wherein the coaxial cable is at least in part in walls, and said coaxial cable modem is operative to communicate with another modem of the same type in the building.

* * * * *